United States Patent [19]
Iizuka

[11] Patent Number: 5,251,069
[45] Date of Patent: Oct. 5, 1993

[54] IMAGING LENS SYSTEM
[75] Inventor: Takashi Iizuka, Tokyo, Japan
[73] Assignee: Asahi Kogaku Kogyo K.K., Tokyo, Japan
[21] Appl. No.: 526
[22] Filed: Jan. 4, 1993

Related U.S. Application Data
[63] Continuation of Ser. No. 915,766, Jul. 21, 1992, abandoned, which is a continuation of Ser. No. 634,907, Dec. 27, 1990, abandoned.

[30] Foreign Application Priority Data
Dec. 28, 1989 [JP] Japan ............................ 1-344030

[51] Int. Cl.$^5$ ........................ G02B 15/14; G02B 13/18
[52] U.S. Cl. ................... 359/717; 359/773; 359/775; 359/781; 359/785; 359/823
[58] Field of Search ............... 359/717, 823, 785, 775, 359/773, 781

[56] References Cited
U.S. PATENT DOCUMENTS 4,776,681 10/1988 Moskovich .................. 350/432
4,865,435 9/1989 Cho ............................ 350/432

Primary Examiner—Scott J. Sugarman
Attorney, Agent, or Firm—Sughrue, Mion, Zinn, Macpeak & Seas

[57] ABSTRACT

An imaging lens system is disclosed which comprises a focusing lens and a correcting lens which has aspherical surfaces on both side. Usually, the focusing lens if located on the object side but the correcting lens may be disposed on the object side.

16 Claims, 28 Drawing Sheets

IMAGING LENS SYSTEM

This is a continuation of application Ser. No. 07/915,766, filed Jul. 21, 1992, now abandoned, which is a continuation of application Ser. No. 07/634,907, filed Dec. 27, 1990, now abandoned.

BACKGROUND OF THE INVENTION

The present invention relates to an imaging lens for imaging and focusing an image of an object on an image plane, and relates to a compact lens system having a small number of lens elements and a lens system having a large number of lens elements with high performance.

Imaging lenses which are to be used in equipment that requiring high resolution must have comparable imaging performance as compared to conventional photographic lenses such as those used with single-lens reflex cameras. However, if imaging lenses are to be used with equipment such as handy picturephones which comparatively low resolution, they should satisfy more of the requirement for compactness than imaging performance and it is necessary to design a most compact system using the smallest possible number of lens elements. Imaging lens systems that have been commonly used in these applications are composed of three glass lens elements having spherical surfaces. As long as spherical lens elements are used, it is difficult to further reduce their number without sacrificing the imaging performance of the system.

FIG. 51 is a simplified cross section of a prior art imaging lens system that comprises three lens elements 1, 2 and 3. FIG. 52 shows lateral aberrations caused in the lens system shown in FIG. 51. Shown by 4 in FIG. 51 is cover glass. FIG. 53 is a simplified cross section of another prior art imaging lens system comprising only one aspheric lens element 5 to achieve reduction in the number of lens elements used. However, as is clear from FIG. 54, this system experiences considerable deterioration in performance, particularly in the marginal area. Although the imaging lens shown in FIG. 51 meets the requirement of the imaging lens performance, the number of the lens elements is increased. Inversely, although the lens shown in FIG. 53 has the minimum small number of elements, the performance thereof degrades in the marginal portion.

SUMMARY OF THE INVENTION

The present invention has been made under these circumstances and has as a primary object providing an imaging lens system that uses less than three lens elements and which yet insures the necessary performance.

An imaging lens according to the invention is characterized in that in order to attain the above-noted and other objects, an imaging lens and a compensation lens having aspherical surfaces on both sides are used in combination.

DESCRIPTION OF THE PREFERRED EMBODIMENTS

Figure 1:
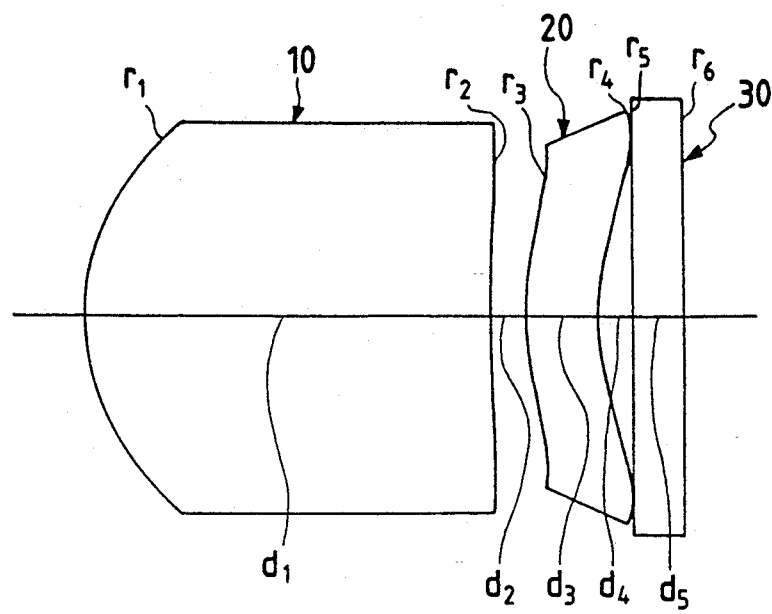
FIG. 1 is a simplified cross section of an imaging lens system according to the first example of the present invention.

The present invention will now be described with respect to the accompanying drawings.

According to the present invention, it provides a lens system which satisfies the following conditions:

$$0.75 < f/f_1 < 1.0 \quad (1)$$

$$-0.10 < f/f_2 < 0 \quad (2)$$

$$0.3 < r_1/d_1 < 1.0 \quad (3)$$

where f is the focal length of the overall system at a predominant wavelength, $f_1$ is the focal length of the focusing lens element, $f_2$ is the focal length of the correcting lens element, $r_1$ is the paraxial radius of curvature of the first surface of the focusing lens element and $d_1$ is the on-axis thickness of the focusing lens element.

Conditions (1) and (2) relate to curvature of the field and astigmatism. If the lower limit of condition (1) is not reached or if the upper limit of condition (2) is exceeded, sagittal curvature of the field will become excessive. If, on the other hand, the upper limit of condition (1) is exceeded or if the lower limit of condition (2) is not reached, not only does astigmatism increase but also the refractive powers of the focusing and correcting lens elements will become excessive to produce coma.

Condition (3) relates to curvature of the field and coma. If the upper limit of this condition is exceeded, meridional curvature of the field will increase. If the lower limit of condition (3) is not reached, coma will develop.

Further, an imaging lens system satisfies the following conditions:

$$-1.0 \times 10^{-1} < \Delta X_1(0.2f)/f < -1.0 \times 10^{-3} \quad (4)$$

$$-1.0 \times 10^{-1} < \Delta X_2(0.2f)/f < -1.0 \times 10^{-3} \quad (5)$$

where f is the focal length of the overall system, assuming that $\Delta X_N(Y)$, or the dedication from a paraxial curved surface of a point of the aspheric object-side surface (N=1) or image-side surface (N=2) of the correcting lens element at height Y from the optical axis, is defined by the following equation:

$$\Delta X_N(Y) = \frac{CY^2}{1 + \sqrt{1 - (1+K)C^2Y^2}} + \Sigma A_n Y^n - \frac{CY^2}{1 + \sqrt{1 - C^2Y^2}}$$

where An signifies the 4th, 6th, 8th, ... and nth order asphericity coefficients of lens; K is a conicity coefficient; and C is the curvature (1/r) of the apex of an aspheric surface.

Conditions (4) and (5) both relate to astigmatism and distortion. If the lower limit of either condition is not reached negative distortion will develop in the range of small image heights. If the upper limit of either condition is exceeded, not only meridional curvature of the field but also astigmatism will increase.

In order to effectively use the correcting lens, the inlet pupil of the correcting lens is located inside the imaging lens, and the following condition should be met:

$$-0.4 < d_0/f < -0.2 \quad (6)$$

where $d_0$ is the distance from a surface on the object side of the correcting lens to the inlet pupil of the correcting lens and f is the overall focal length.

Condition (6) define the position of the inlet pupil of the correcting lens. If this condition is not met, the astigmatism is increased to deteriorate the focusing performance.

EXAMPLES

The present invention is described below more specifically with reference to FIGS. 1-13 which show six examples of the imaging lens system of the present invention.

EXAMPLE 1

Figure 2:
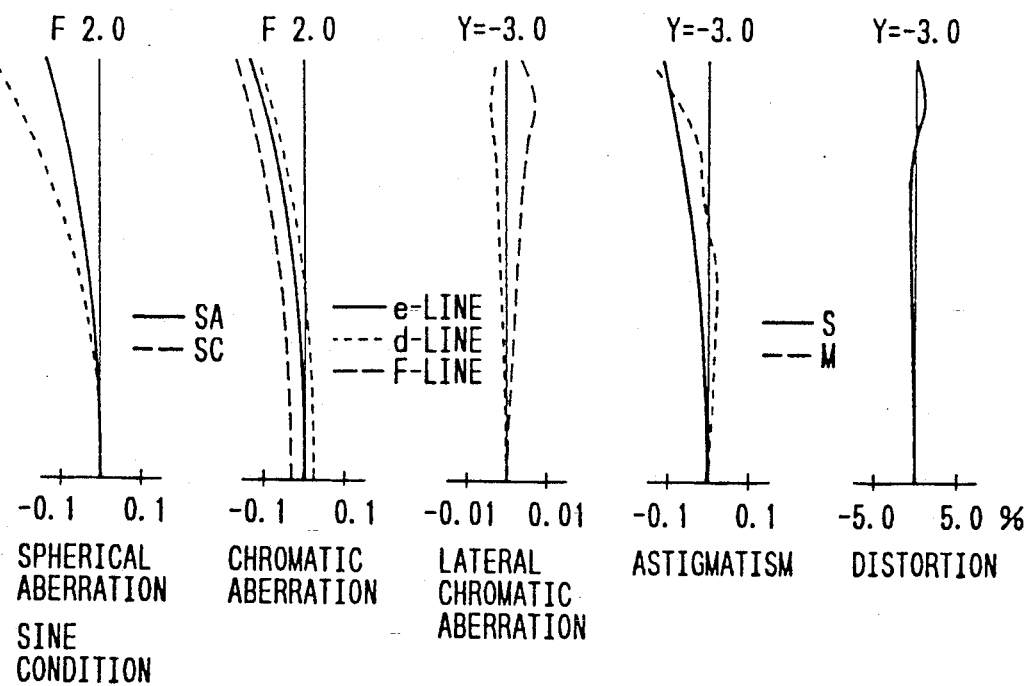
FIG. 2 is a set of graphs plotting the aberration curves obtained with the imaging lens system shown in FIG. 1.
Figure 3:
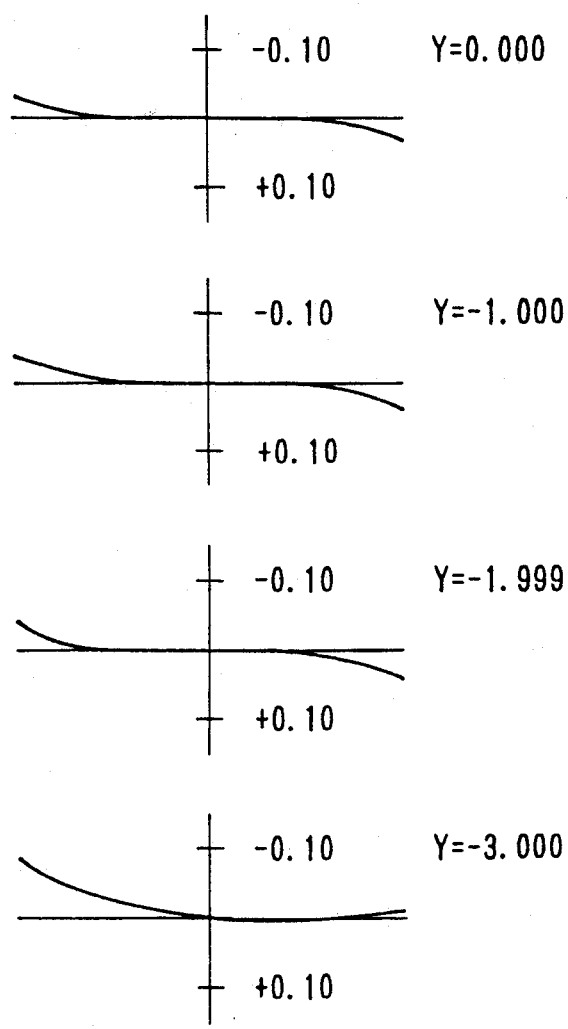
FIG. 3 is a set of graphs plotting the lateral aberration curves obtained with the lens system shown in FIG. 1.

FIGS. 1-3 show the first example of the imaging lens system of the present invention. As shown, this example of the imaging lens system comprises a focusing lens element 10 having aspheric surfaces on both sides and a correcting lens element 20 that is positioned on the image side of the focusing lens element 10 and which has aspheric surfaces on both sides. A sensor (not shown) for reading the signal associated with the image to be formed is positioned on the image side of the correcting lens element 20. The sensor is sealed with cover glass 30 to insure that its light-receiving surface will not be directly exposed to moisture. The space between the light-receiving surface of the sensor and the cover glass is filled with nitrogen gas.

The correcting lens element 20 has a convex surface toward the object on both sides in the paraxial area and it has such a special geometry that the direction of a displacement along the aspheric surface is opposite the paraxial radius of curvature of said aspheric surface. An aspheric shape that satisfies these conditions can be easily realized using plastic materials.

The numerical values that characterize the arrangement of the first example of the imaging lens system of the present invention are listed in Table 1 below, in which: $F_{NO}$ is the F number; f is the focal length at a predominant wavelength; m is the magnification; r is the radius of curvature of an individual lens surface; d is the lens thickness or the aerial distance between lenses; $n_d$ is the refractive index of lens at the d-lien (588 nm); $\nu$ is the Abbe number; and $n_e$ is the refractive index of lens at the e-line (546 nm). The numerals listed in the column of r(radius of curvature) for aspheric surface refer to the radius of curvature of the apex of the aspheric surface. The shape of an aspheric surface is expressed by:

$$X = \frac{CY^2}{1 + \sqrt{1 - (1+K)C^2Y^2}} + A_4Y^4 + A_6Y^6 + A_8Y^8 + A_{10}Y^{10}$$

where X is the distance between a plane tangential to the apex of the aspheric surface and a point on that surface at height Y from the optical axis, C is the curvature (1/r) of the apex of the aspheric surface, K is a conicity coefficient, and $A_4$–$A_{10}$ are the fourth to tenth order asphericity coefficients. The conicity and asphericity coefficients of individual lens surfaces are listed in the lower part of Table 1.

TABLE 1

Predominant wavelength = 546 nm; $F_{no}$ = 1:2.0; f = 6.01; m = −0.020

| Surface No. | r | d | $n_d$ | $\nu$ | $N_e$ |
|---|---|---|---|---|---|
| 1 | 3.042 | 5.74 | 1.49186 | 57.4 | 1.49399 |
| 2 | 12.990 | 0.50 | | | |
| 3 | 3.000 | 1.00 | 1.49186 | 57.4 | 1.49399 |
| 4 | 2.660 | 0.50 | | | |
| 5 | ∞ | 0.70 | 1.51633 | 64.1 | 1.51825 |
| 6 | ∞ | | | | |

Asphericity coefficient:

| 1st surface | 2nd surface |
|---|---|
| K = −0.194624 × 10 | K = −0.130050 × 10 |
| $A_4$ = 0.713727 × $10^{-2}$ | $A_4$ = −0.135549 × $10^{-1}$ |
| $A_6$ = 0.778110 × $10^{-5}$ | $A_6$ = 0.297119 × $10^{-2}$ |
| $A_8$ = 0.000000 | $A_8$ = 0.000000 |
| $A_{10}$ = 0.000000 | $A_{10}$ = 0.000000 |
| 3rd surface | 4th surface |
| K = −0.978653 | K = −0.789604 × 10 |
| $A_4$ = −0.428196 × $10^{-1}$ | $A_4$ = 0.227504 × $10^{-2}$ |
| $A_6$ = 0.759195 × $10^{-2}$ | $A_6$ = −0.438489 × $10^{-2}$ |
| $A_8$ = −0.637356 × $10^{-3}$ | $A_8$ = 0.102247 × $10^{-2}$ |
| $A_{10}$ = −0.319293 × $10^{-5}$ | $A_{10}$ = −0.749587 × $10^{-4}$ |

FIG. 2 is a set of graphs plotting the aberration curves obtained with the lens arrangement shown in Table 1, and FIG. 3 is a set of graphs plotting the lateral aberration curves obtained with the same lens arrangement.

EXAMPLE 2

Figure 4:
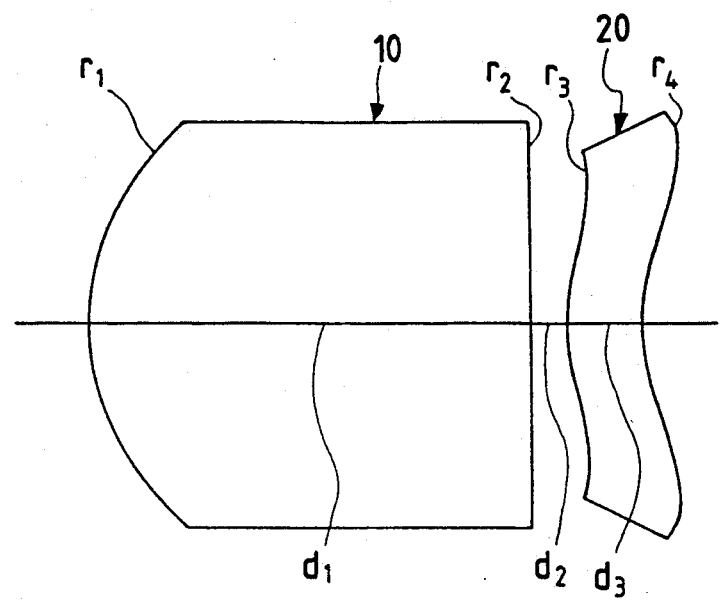
FIG. 4 is a simplified cross section of an imaging lens system according to the second example of the present invention.

FIG. 4 shows the second example of the imaging lens system of the present invention. As shown, the correcting lens element 20 provided on the image side of the focusing lens element 10 also serves as the cover of the sensor.

Figure 5:
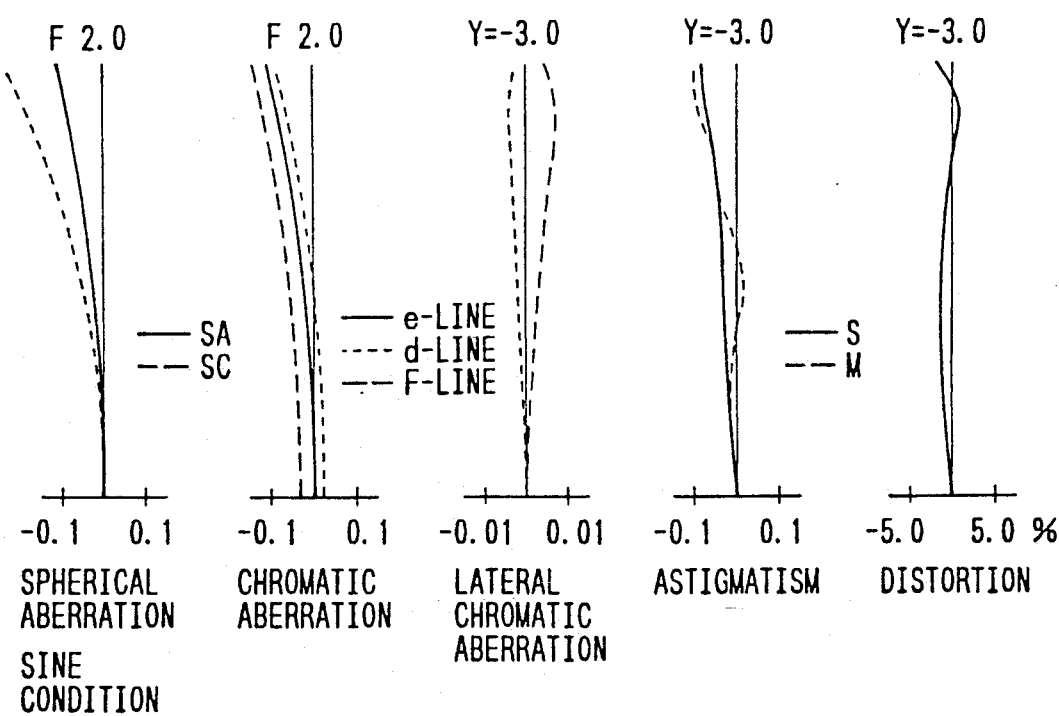
FIG. 5 is a set of graphs plotting the aberration curves obtained with the lens system shown in FIG. 4.

The numerical values that characterize the lens arrangement of this system are listed in Table 2 below, in which the respective symbols have the same meanings as those appearing in Table 1 FIG. 5 is a set of graphs plotting the aberration curves obtained with the lens arrangement shown in Table 2.

TABLE 2

Predominant wavelength = 546 nm; $F_{no}$ = 1:2.0; f = 5.99; m = −0.020

| Surface No. | r | d | $n_d$ | $\nu$ | $N_e$ |
|---|---|---|---|---|---|
| 1 | 3.124 | 6.00 | 1.49186 | 57.4 | 1.49399 |
| 2 | 12.581 | 0.50 | | | |
| 3 | 2.366 | 1.00 | 1.49186 | 57.4 | 1.49399 |
| 4 | 2.031 | | | | |

Asphericity coefficient:

| 1st surface | 2nd surface |
|---|---|
| K = −0.187101 × 10 | K = −0.131636 × 10 |
| $A_4$ = 0.625802 × $10^{-2}$ | $A_4$ = −0.258346 × $10^{-1}$ |
| $A_6$ = −0.380279 × $10^{-4}$ | $A_6$ = 0.474393 × $10^{-2}$ |
| $A_8$ = 0.000000 | $A_8$ = 0.000000 |
| $A_{10}$ = 0.000000 | $A_{10}$ = 0.000000 |
| 3rd surface | 4th surface |
| K = −0.149829 × 10 | K = −0.737499 × 10 |
| $A_4$ = −0.559767 × $10^{-1}$ | $A_4$ = 0.481425 × $10^{-2}$ |
| $A_6$ = 0.106388 × $10^{-1}$ | $A_6$ = −0.500481 × $10^{-2}$ |
| $A_8$ = −0.144178 × $10^{-2}$ | $A_8$ = 0.940866 × $10^{-3}$ |
| $A_{10}$ = 0.792364 × $10^{-4}$ | $A_{10}$ = −0.645239 × $10^{-4}$ |

EXAMPLE 3

Figure 6:
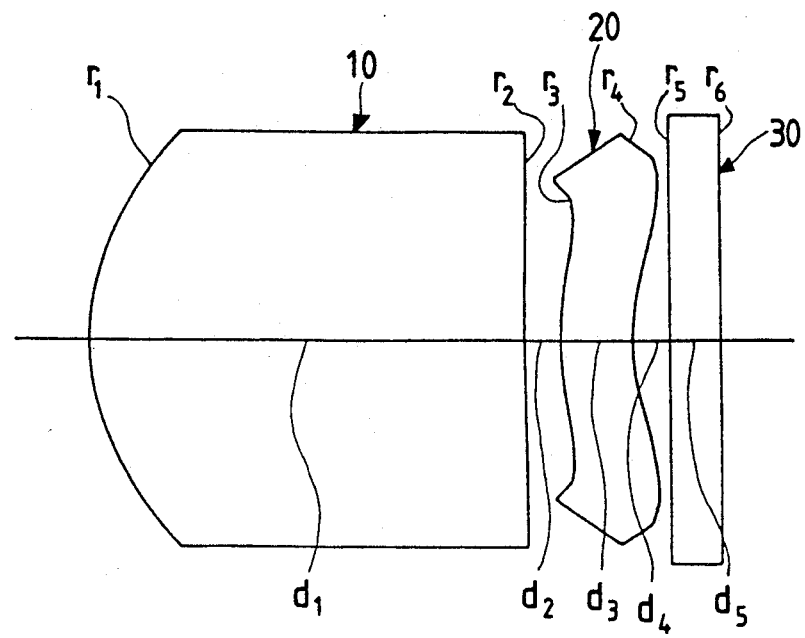
FIG. 6 is a simplified cross section of an imaging lens system according to the third example of the present invention.

FIG. 6 shows the third example of the imaging lens system of the present invention. As in Example 1, the third example of the imaging lens system comprises a focusing lens element 10 and the correcting lens element 20, with sensor cover glass 30 being provided on the image side of the correcting lens.

Figure 7:
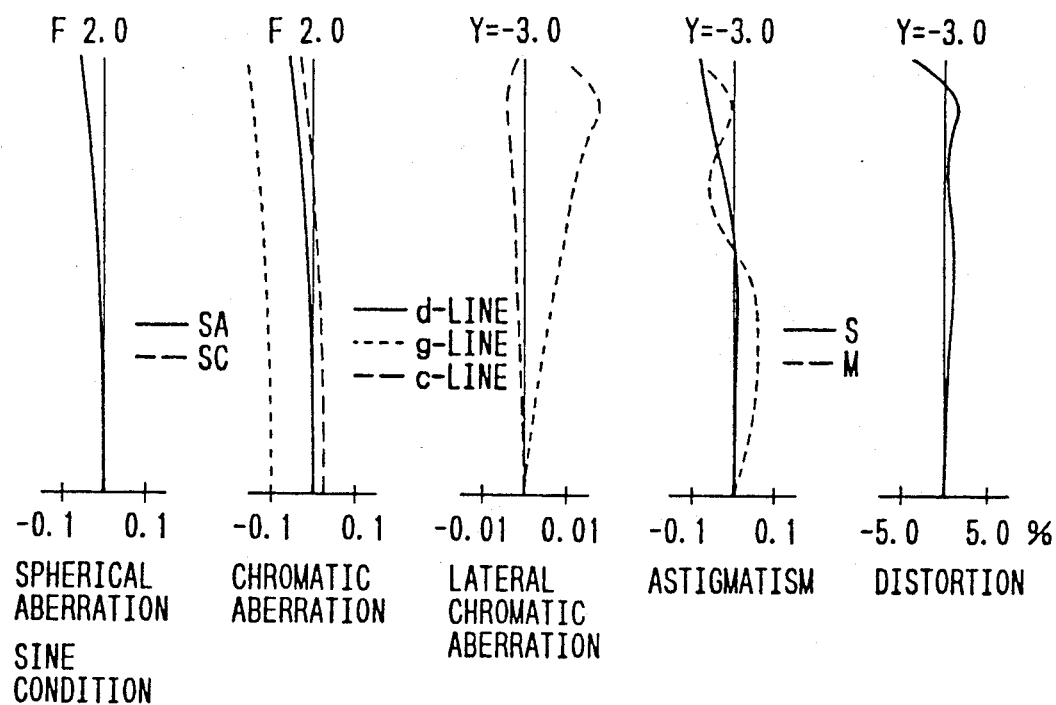
FIG. 7 is a set of graphs plotting the aberration curves obtained with the lens system shown in FIG. 6.

The numerical values that characterize the arrangement of the this imaging lens system are listed in Table 3, and the aberration curves obtained with that lens arrangement are plotted in graphs in FIG. 7.

In this third example, as well as the fourth and fifth examples that follow, both the focusing lens 10 and the correcting lens 20 are formed of APO ® (the trademark for an amorphous polyolefin). PMMA (polymethyl methacrylate) which is conventionally used as the constituent material of plastic lenses experiences substantial changes in refraction with temperature or humidity and, hence, its optical performance is highly depended on the environment. In particular, changes in humidity will not only cause defocusing but also disturb the wavefronts of light flux. APO ®, the low moisture absorption plastic material developed by Mitsui Petrochemical Industries, Ltd., has a water absorption of no more than 0.01% which is one tenth the value for PMMA and is less sensitive to changes in humidity. Therefore, the use of APO ® as a lens material is effective in further stabilizing the performance of the lens system.

TABLE 3

Predominant wavelength = 588 nm; $F_{no}$ = 1:2.0; f = 6.01; m = −0.020

| Surface No. | r | d | $n_d$ | ν |
|---|---|---|---|---|
| 1 | 3.412 | 5.94 | 1.55000 | 55.0 |
| 2 | 14.137 | 0.50 | | |
| 3 | 2.903 | 1.00 | 1.55000 | 55.0 |
| 4 | 2.527 | 0.50 | | |
| 5 | ∞ | 0.70 | 1.51633 | 64.1 |
| 6 | ∞ | | | |

Asphericity coefficient:

| 1st surface | 2nd surface |
|---|---|
| K = −0.784881 | K = −0.126037 × 10 |
| $A_4$ = 0.164109 × $10^{-2}$ | $A_4$ = −0.149559 × $10^{-1}$ |
| $A_6$ = 0.342210 × $10^{-4}$ | $A_6$ = 0.246460 × $10^{-2}$ |
| $A_8$ = 0.000000 | $A_8$ = 0.000000 |
| $A_{10}$ = 0.000000 | $A_{10}$ = 0.000000 |
| 3rd surface | 4th surface |
| K = −0.966747 | K = −0.783520 × 10 |
| $A_4$ = −0.656687 × $10^{-1}$ | $A_4$ = 0.466273 × $10^{-3}$ |
| $A_6$ = 0.135790 × $10^{-1}$ | $A_6$ = −0.800952 × $10^{-2}$ |
| $A_8$ = −0.486677 × $10^{-3}$ | $A_8$ = 0.218457 × $10^{-2}$ |
| $A_{10}$ = −0.301009 × $10^{-3}$ | $A_{10}$ = −0.192248 × $10^{-3}$ |

EXAMPLE 4

Figure 8:
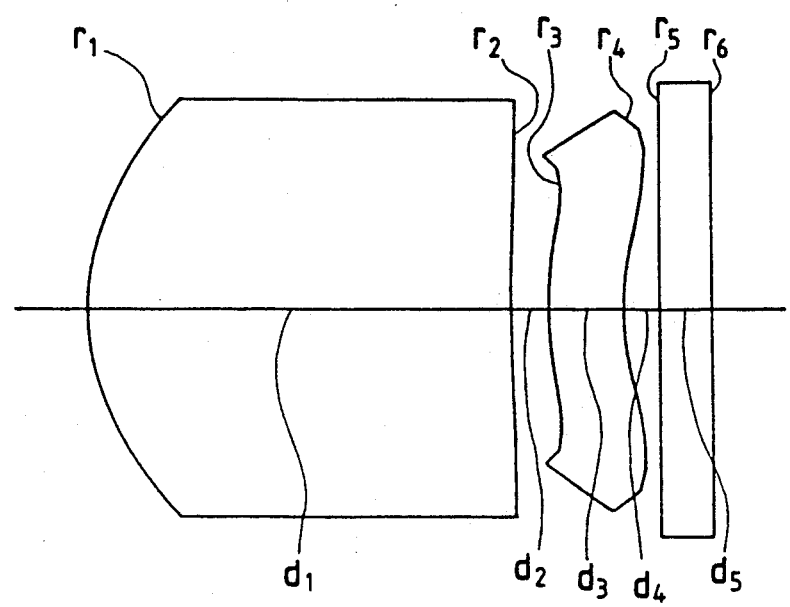
FIG. 8 is a simplified cross section of an imaging lens system according to the fourth example of the present invention.

FIG. 8 shows the fourth example of the imaging lens system of the present invention. As in Example 1, the fourth example of the imaging lens system comprises a focusing lens element 10 and the correcting lens 20, with sensor cover glass 30 being provided on the image side of the correcting lens.

Figure 9:
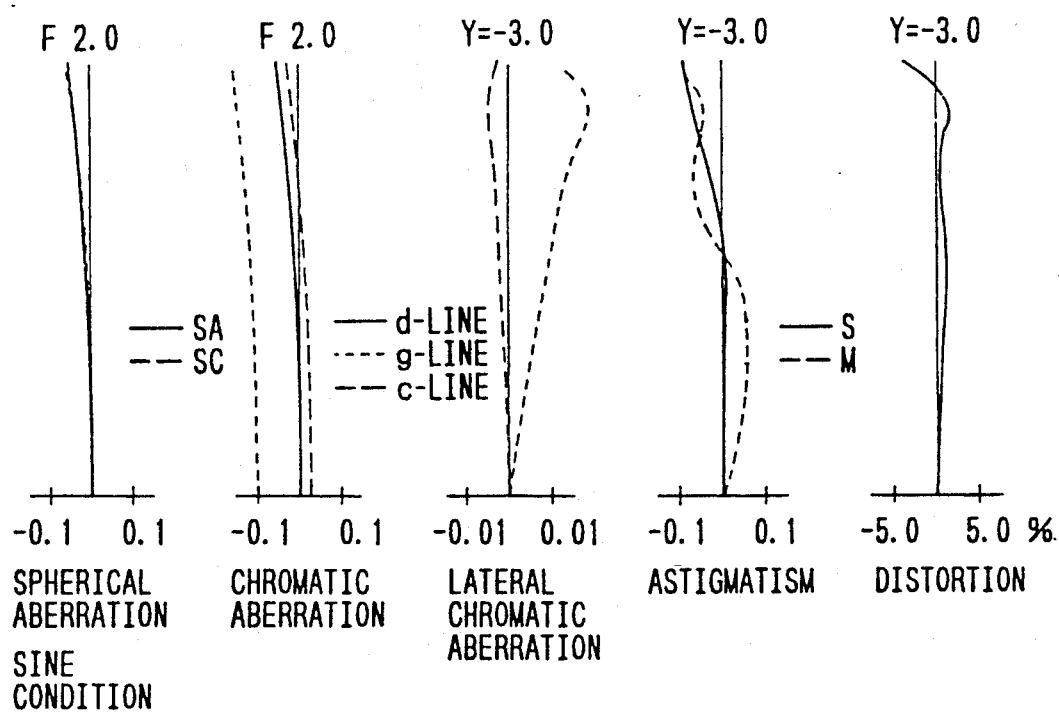
FIG. 9 is a set of graphs plotting the aberration curves obtained with the lens system shown in FIG. 8.

The numerical values that characterize the arrangement of the this imaging lens system are listed in Table 4, and the aberration curves obtained with that lens arrangement are plotted in graphs in FIG. 9.

TABLE 4

Predominant wavelength = 588 nm; $F_{no}$ = 1:2.0; f = 6.01; m = −0.020

| Surface No. | r | d | $n_d$ | ν |
|---|---|---|---|---|
| 1 | 3.338 | 5.77 | 1.55000 | 55.0 |
| 2 | 12.011 | 0.50 | | |
| 3 | 3.027 | 1.00 | 1.55000 | 55.0 |
| 4 | 2.648 | 0.50 | | |
| 5 | ∞ | 0.70 | 1.51633 | 64.1 |
| 6 | ∞ | | | |

Asphericity coefficient:

| 1st surface | 2nd surface |
|---|---|
| K = −0.731898 | K = −0.125657 × 10 |
| $A_4$ = 0.157031 × $10^{-2}$ | $A_4$ = −0.146472 × $10^{-1}$ |
| $A_6$ = 0.383063 × $10^{-4}$ | $A_6$ = 0.274962 × $10^{-2}$ |
| $A_8$ = 0.000000 | $A_8$ = 0.000000 |
| $A_{10}$ = 0.000000 | $A_{10}$ = 0.000000 |
| 3rd surface | 4th surface |
| K = −0.970902 | K = −0.855780 × 10 |
| $A_4$ = −0.682295 × $10^{-1}$ | $A_4$ = −0.154062 × $10^{-2}$ |
| $A_6$ = 0.148957 × $10^{-1}$ | $A_6$ = −0.829566 × $10^{-2}$ |
| $A_8$ = −0.358825 × $10^{-3}$ | $A_8$ = 0.244783 × $10^{-2}$ |
| $A_{10}$ = −0.409921 × $10^{-3}$ | $A_{10}$ = −0.228862 × $10^{-3}$ |

EXAMPLE 5

Figure 10:
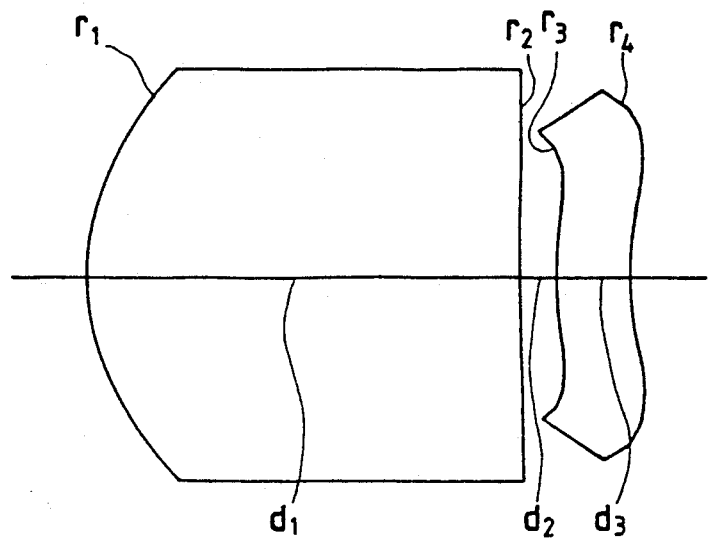
FIG. 10 is a simplified cross section of an imaging lens system according to the fifth example of the present invention.

FIG. 10 shows the fifth example of the imaging lens system of the present invention. As in Example 2, the fifth example of the imaging lens system comprises a focusing lens element 10 and the correcting lens element 20 that is provided on the image side of the focusing lens and which also serves as the sensor cover. Both lenses are formed of APO ®. If the correcting lens 20 serving as the cover glass is formed of PMMA or some other highly hygroscopic resins, it absorbs and rejects moisture, potentially causing devitrification that is deleterious to the sensor performance. However, if the correcting lens is made of APO ® as in Example 5, the light-receiving surface of the sensor is protected against moisture, thereby preventing the deterioration of the sensor performance.

Figure 11:
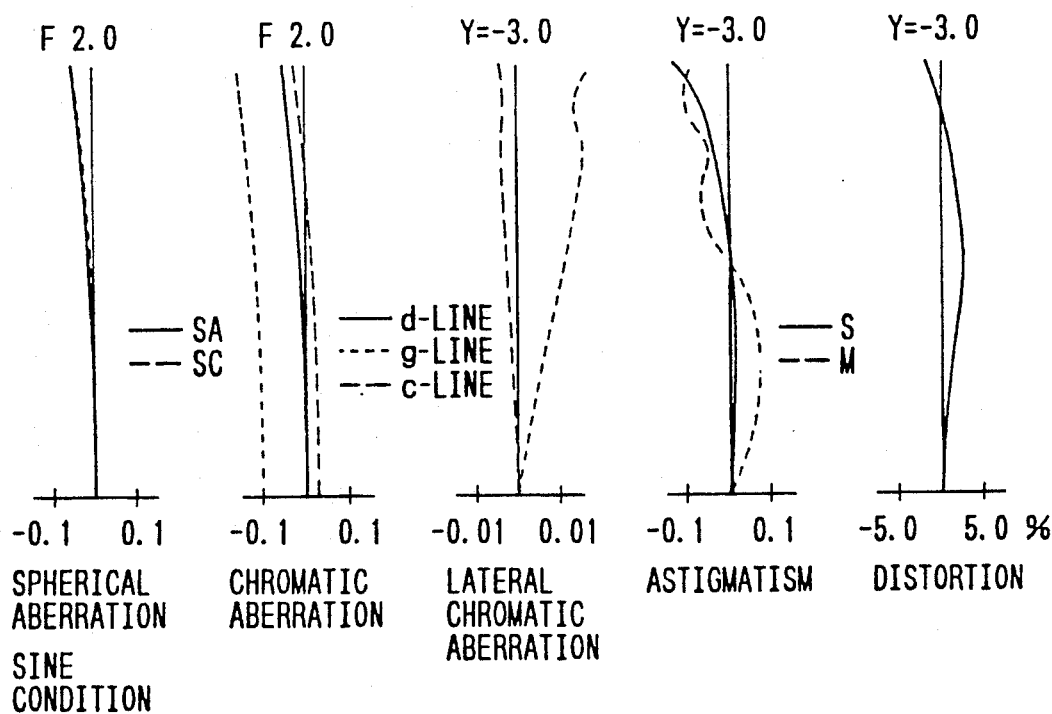
FIG. 11 is a set of graphs plotting the aberration curves obtained with the lens system shown in FIG. 10.

The numerical values that characterize the arrangement of the fifth example of the imaging lens system are listed in Table 5 and the aberration curves obtained with that lens arrangement are plotted in graphs in FIG. 11.

TABLE 5

Predominant wavelength = 588 nm; $F_{no}$ = 1:2.0; f = 6.03; m = −0.020

| Surface No. | r | d | $n_d$ | ν |
|---|---|---|---|---|
| 1 | 3.326 | 5.88 | 1.55000 | 55.0 |
| 2 | 12.215 | 0.50 | | |
| 3 | 3.349 | 1.00 | 1.55000 | 55.0 |
| 4 | 2.968 | | | |

Asphericity coefficient:

| 1st surface | 2nd surface |
|---|---|
| K = −0.754667 | K = −0.125619 × 10 |
| $A_4$ = 0.156275 × $10^{-2}$ | $A_4$ = −0.174198 × $10^{-1}$ |
| $A_6$ = 0.378961 × $10^{-4}$ | $A_6$ = 0.298733 × $10^{-2}$ |
| $A_8$ = 0.000000 | $A_8$ = 0.000000 |
| $A_{10}$ = 0.000000 | $A_{10}$ = 0.000000 |
| 3rd surface | 4th surface |
| K = −0.974257 | K = −0.878669 × 10 |
| $A_4$ = −0.755966 × $10^{-1}$ | $A_4$ = −0.986136 × $10^{-2}$ |
| $A_6$ = 0.142915 × $10^{-1}$ | $A_6$ = −0.765810 × $10^{-2}$ |
| $A_8$ = −0.167593 × $10^{-3}$ | $A_8$ = 0.233115 × $10^{-2}$ |
| $A_{10}$ = −0.669631 × $10^{-3}$ | $A_{10}$ = −0.256260 × $10^{-3}$ |

EXAMPLE 6

Figure 12:
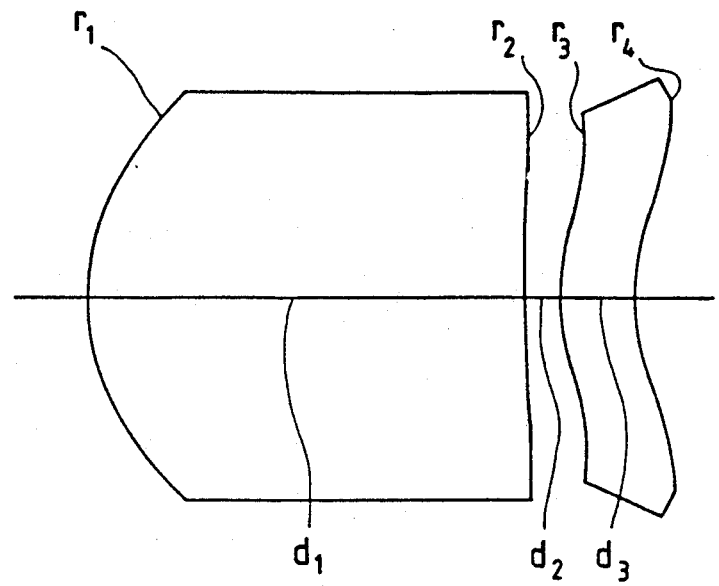
FIG. 12 is a simplified cross section of an imaging lens system according to the sixth example of the present invention.

FIG. 12 shows the sixth example of the imaging lens system of the present invention. As in Example 2, the sixth example of the imaging lens system comprises a focusing lens element 10 and the correcting lens 20 that is provided on the image side of the focusing lens and which also serves as the sensor cover.

Figure 13:
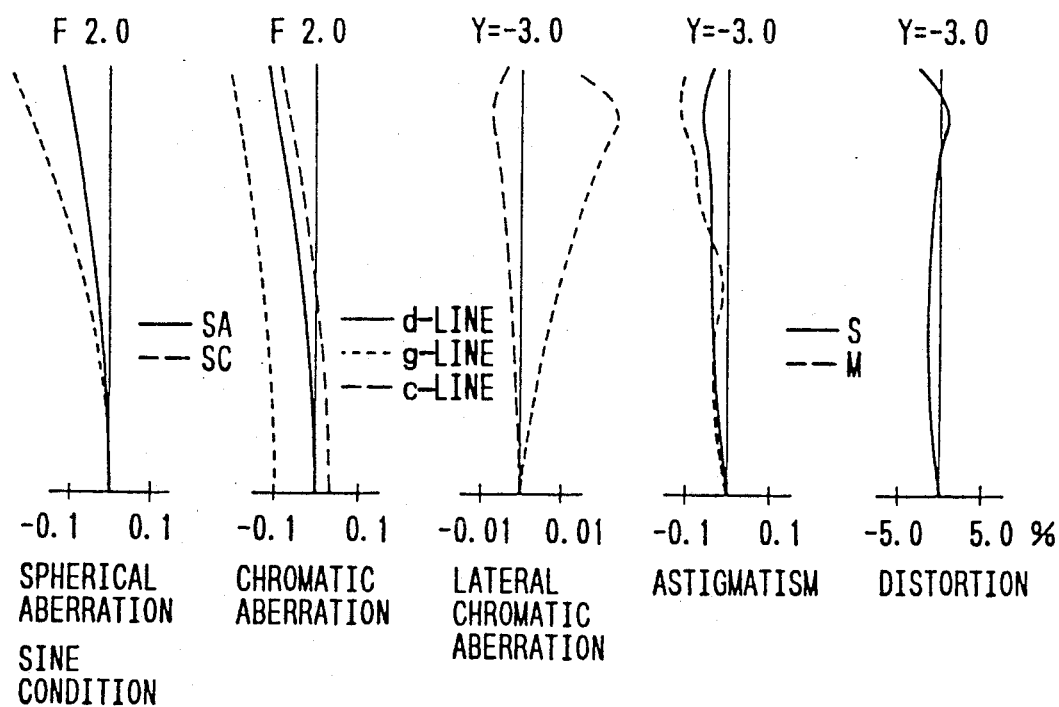
FIG. 13 is a set of graphs plotting the aberration curves obtained with the lens system shown in FIG. 12.

The numerical values that characterize the arrangement of the sixth example of the imaging lens system are listed in Table 6 below and the aberration curves obtained with that lens arrangement are plotted in graphs in FIG. 13.

TABLE 6

Predominant wavelength = 588 nm; $F_{no}$ = 1:2.0; f = 6.03; m = −0.020

| Surface No. | r | d | $n_d$ | ν |
|---|---|---|---|---|
| 1 | 3.074 | 6.00 | 1.49186 | 57.4 |
| 2 | 8.748 | 0.50 | | |
| 3 | 2.450 | 1.00 | 1.62041 | 60.3 |
| 4 | 2.062 | | | |

Asphericity coefficient:

| 1st surface | 2nd surface |
|---|---|
| K = −0.130940 × 10 | K = −0.130433 × 10 |
| $A_4$ = 0.447807 × $10^{-2}$ | $A_4$ = −0.242819 × $10^{-1}$ |
| $A_6$ = 0.117284 × $10^{-4}$ | $A_6$ = 0.451440 × $10^{-2}$ |
| $A_8$ = 0.000000 | $A_8$ = 0.000000 |
| $A_{10}$ = 0.000000 | $A_{10}$ = 0.000000 |
| 3rd surface | 4th surface |
| K = −0.112895 × 10 | K = −0.765573 × 10 |
| $A_4$ = −0.519064 × $10^{-1}$ | $A_4$ = 0.293394 × $10^{-2}$ |
| $A_6$ = 0.969186 × $10^{-2}$ | $A_6$ = −0.403625 × $10^{-2}$ |
| $A_8$ = −0.117606 × $10^{-2}$ | $A_8$ = 0.799504 × $10^{-3}$ |

TABLE 6-continued

Predominant wavelength = 588 nm; $F_{no}$ = 1:2.0; f = 6.03;
m = −0.020

$A_{10} = 0.528630 \times 10^{-4}$    $A_{10} = -0.555438 \times 10^{-4}$

The numerical values that satisfy conditions (1)–(6) are shown below for the foregoing Examples.

| Example | Condition 1 | 2 | 3 | 4 | 5 | 6 |
|---|---|---|---|---|---|---|
| 1 | 0.890 | −0.003 | 0.530 | $-133 \times 10^{-2}$ | $-1.31 \times 10^{-2}$ | −0.179 |
| 2 | 0.861 | −0.003 | 0.520 | $-2.02 \times 10^{-2}$ | $-2.32 \times 10^{-2}$ | −0.296 |
| 3 | 0.879 | −0.010 | 0.575 | $-1.86 \times 10^{-2}$ | $-1.65 \times 10^{-2}$ | −0.281 |
| 4 | 0.885 | −0.010 | 0.578 | $-1.86 \times 10^{-2}$ | $-1.60 \times 10^{-2}$ | −0.264 |
| 5 | 0.896 | −0.009 | 0.565 | $-2.13 \times 10^{-2}$ | $-1.60 \times 10^{-2}$ | −0.274 |
| 6 | 0.844 | −0.004 | 0.513 | $-1.79 \times 10^{-2}$ | $-2.35 \times 10^{-2}$ | −0.273 |

The foregoing first through sixth examples relates to an imaging lens for use with a compact camera such as a picturephone or a doorphone camera. In order to meet this field, the lens system according to the first through sixth examples is made compact only with a single imaging element and a single correcting element.

In the following examples, a plurality of lens elements are used as an imaging lens to thereby enhance the imaging efficiency in comparison with the foregoing examples. It should be further noted that the seventh through ninth examples relate to zoom lenses.

EXAMPLE 7

Figure 14:
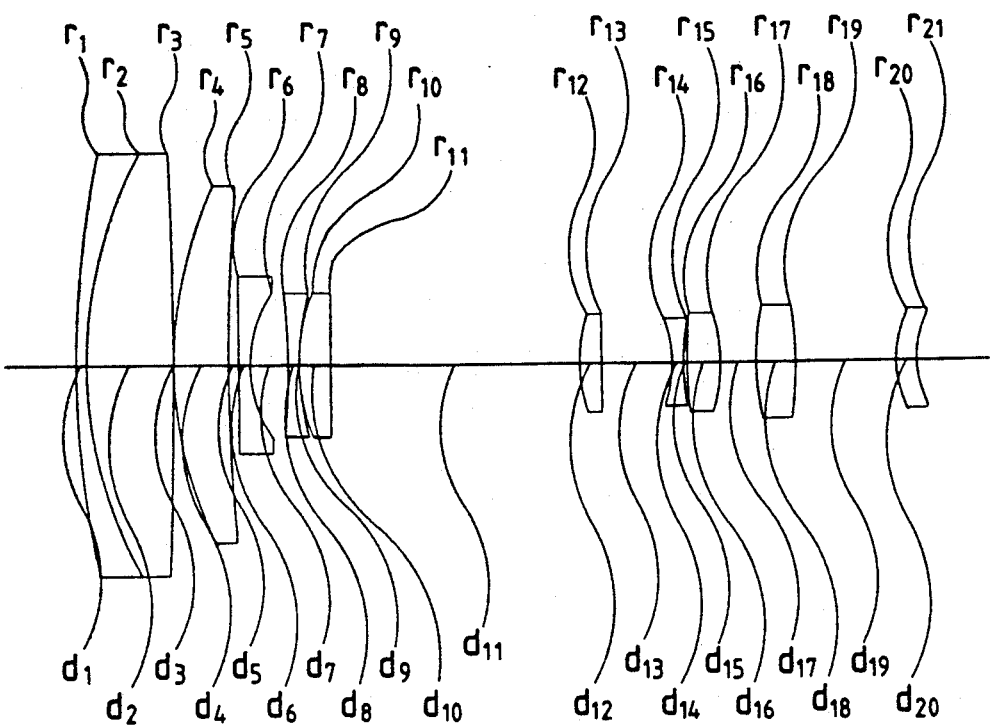
FIG. 14 is a sectional view showing a lens system according to Example 7 at the focal length of 10 mm.

FIG. 14 shows an imaging lens according to Example 7 of the invention. The lens system is composed of an imaging lens having three groups and a correcting lens element having a negative focal length in the paraxial area and aspherical surfaces. The imaging lens system is composed, in order from the object side, of a positive first lens group, a negative second lens group and a positive third lens group. This system is of the zoom lens type which varies its focal length by moving the first and second lens groups in the axial direction and effects focusing by moving the first lens group in the axial direction.

Figure 15:
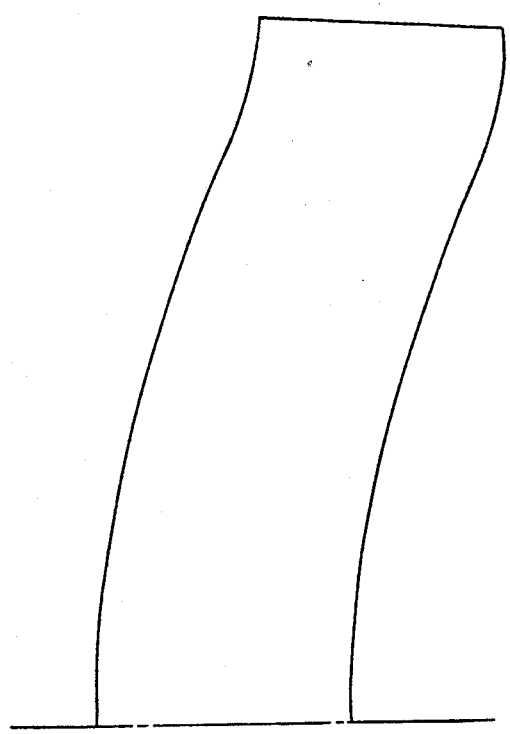
FIG. 15 is an enlarged sectional view showing the correcting lens according to Example 7.

FIG. 15 is an enlarged view showing the shape of the correcting lens.

Figure 16:
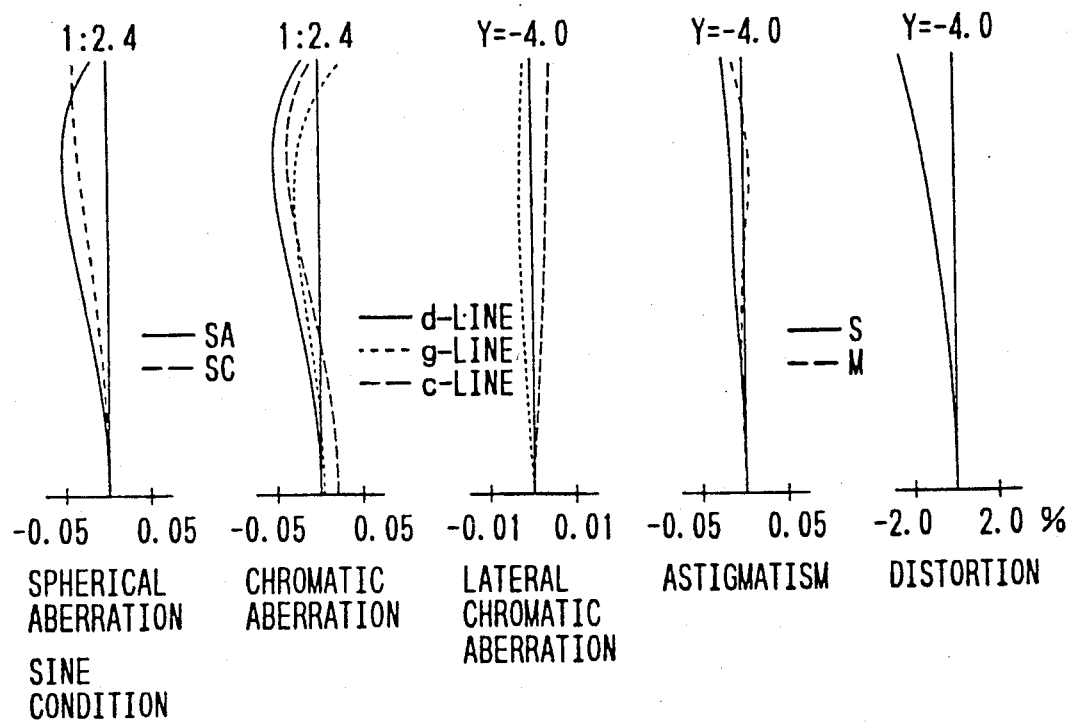
FIG. 16 is graphs showing various aberrations of Example 7 at the focal length of 10 mm.
Figure 17:
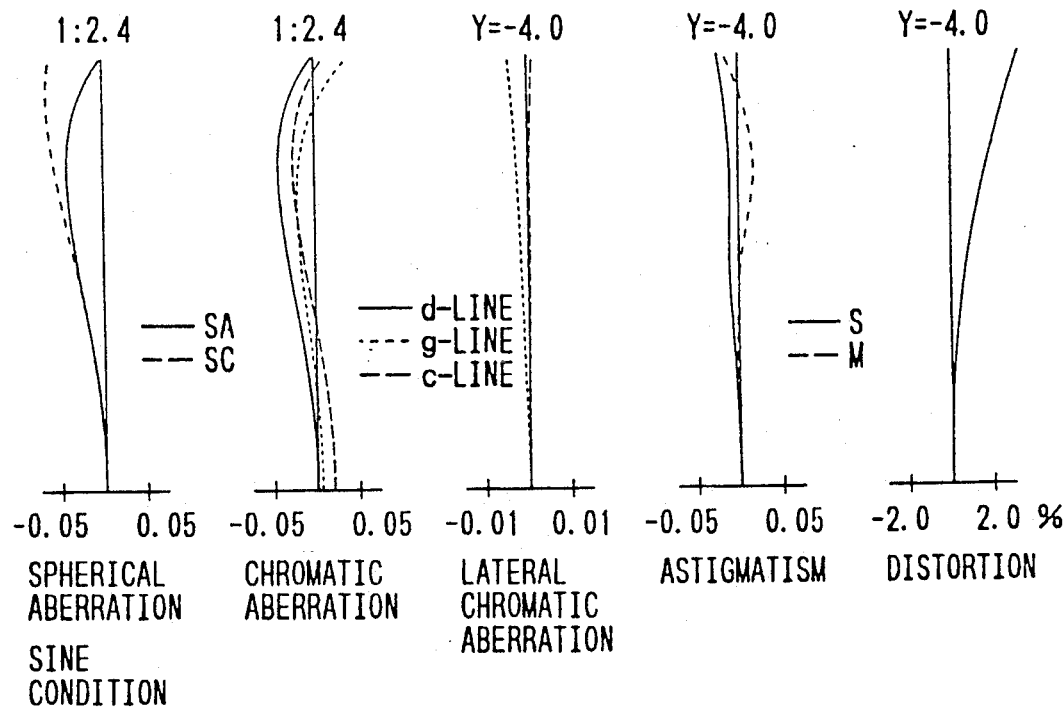
FIG. 17 is graphs showing various aberrations of Example 7 at the focalf length of 20 mm.
Figure 18:
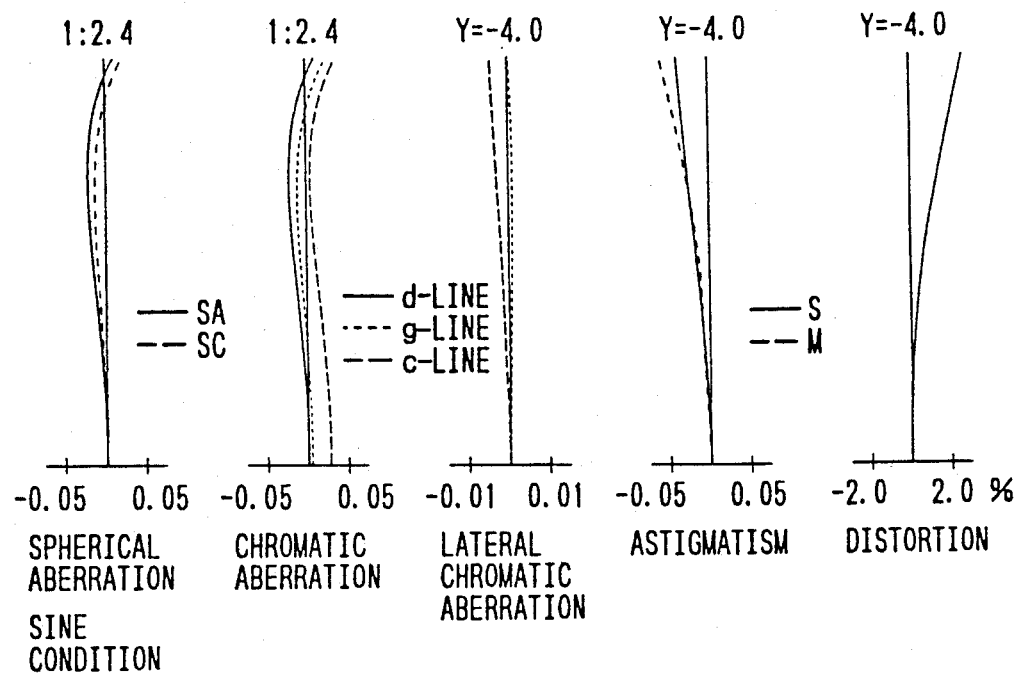
FIG. 18 is graphs showing various aberrations of Example 7 at the focal length of 40 mm.

Numerical data of the seventh example are shown in Table 7, FIG. 16 shows various aberrations at the focal length of 10 mm, FIG. 17 shows aberrations at the focal length of 20 mm and FIG. 18 shows the aberrations at the focal length of 40 mm.

TABLE 7

Stop position: 0.0 mm after thirteenth surface;
$F_{no}$ = 1:2.4

| Surface No. | r | d | n | ν |
|---|---|---|---|---|
| 1 | 84.694 | 1.00 | 1.80518 | 25.4 |
| 2 | 37.958 | 8.00 | 1.62041 | 60.3 |
| 3 | −500.000 | 0.10 | | |
| 4 | 36.815 | 4.96 | 1.66600 | 56.9 |
| 5 | 173.484 | variable | | |
| 6 | −554.810 | 1.00 | 1.77250 | 49.6 |
| 7 | 11.416 | 3.52 | | |
| 8 | −55.561 | 1.00 | 1.77250 | 49.6 |
| 9 | 24.419 | 0.00 | | |
| 10 | 17.395 | 2.80 | 1.80518 | 25.4 |
| 11 | 1326.514 | variable | | |
| 12 | 13.456 | 2.00 | 1.77250 | 49.6 |
| 13 | −1190.200 | 6.46 | | |
| 14 | −10.467 | 1.00 | 1.80518 | 25.4 |
| 15 | 21.233 | 0.38 | | |
| 16 | 48.326 | 3.00 | 1.74800 | 52.9 |
| 17 | −14.443 | 3.29 | | |
| 18 | 23.127 | 3.60 | 1.69680 | 55.5 |
| 19 | −34.620 | 9.22 | | |
| 20 | 8.348 | 2.00 | 1.49176 | 57.4 |
| 21 | 7.774 | | | |

Asphericity coefficient:

| 20th surface | 21st surface |
|---|---|
| K = −0.14803000 × 10 | K = −0.56210000 |
| $A_4 = -0.96124875 \times 10^{-5}$ | $A_4 = -0.23738250 \times 10^{-3}$ |
| $A_6 = -0.10790938 \times 10^{-4}$ | $A_6 = -0.55681875 \times 10^{-5}$ |
| $A_8 = 0.29441875 \times 10^{-6}$ | $A_8 = -0.30791016 \times 10^{-6}$ |
| $A_{10} = -0.12693965 \times 10^{-7}$ | $A_{10} = -0.79271484 \times 10^{-8}$ |

| | | | |
|---|---|---|---|
| ω | 22.3° | 11.0° | 5.6° |
| f | 10.00 | 20.00 | 40.00 |
| $d_5$ | 1.00 | 15.52 | 22.78 |
| $d_{11}$ | 22.85 | 15.48 | 0.72 |

EXAMPLE 8

Figure 19:
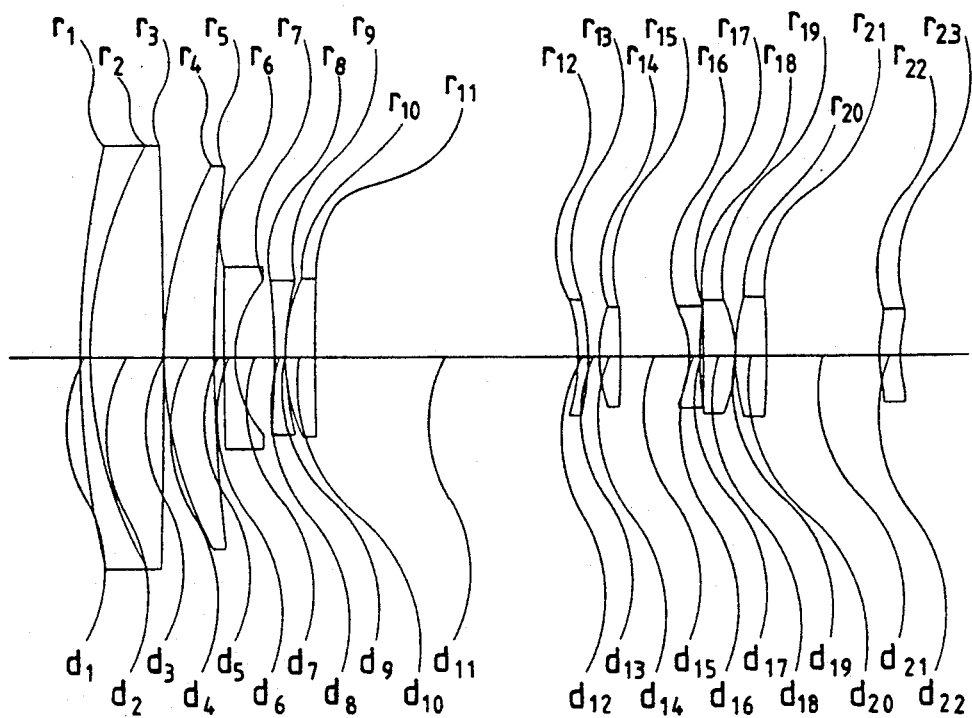
FIG. 19 is a sectional view showing a lens system according to Example 8 at the focal length of 10 mm.

FIG. 19 shows an eighth example of the invention. The lens system is composed of a four group imaging lens and a correcting lens having a negative focal length in the paraxial area and aspherical surfaces on both sides. The imaging lens is composed, in order from the object side, of a positive first lens group, a negative second lens group, a negative third lens group and a positive fourth lens group. The second and third lens groups are moved in the axial direction to thereby change the focal length, whereas the first lens group is moved in the axial direction to effect focusing.

Figure 20:
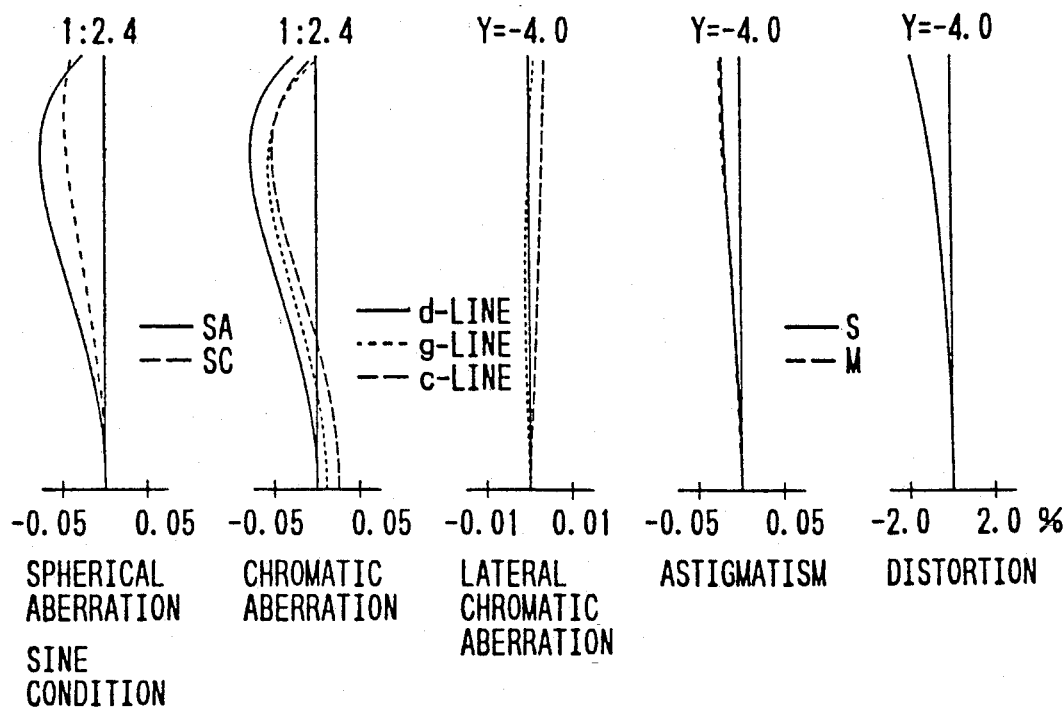
FIG. 20 is graphs showing aberrations of Example 8 at the focal length of 10 mm without the correcting lens.
Figure 21:
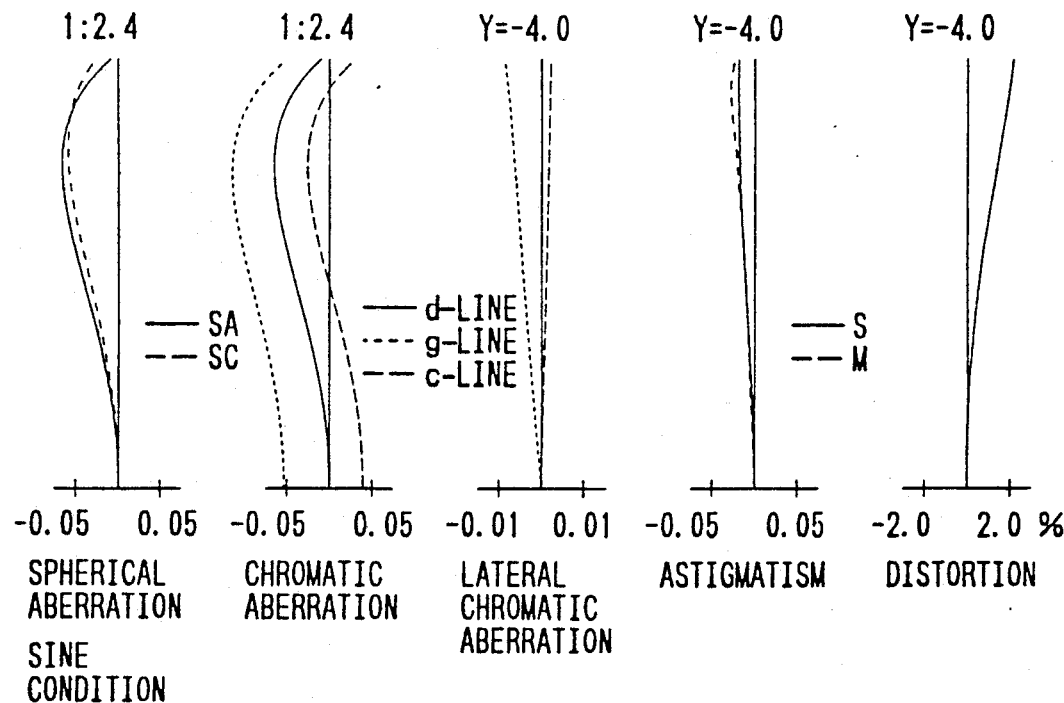
FIG. 21 is graphs showing aberrations of Example 8 at the focal length of 20 mm without the correcting lens.
Figure 22:
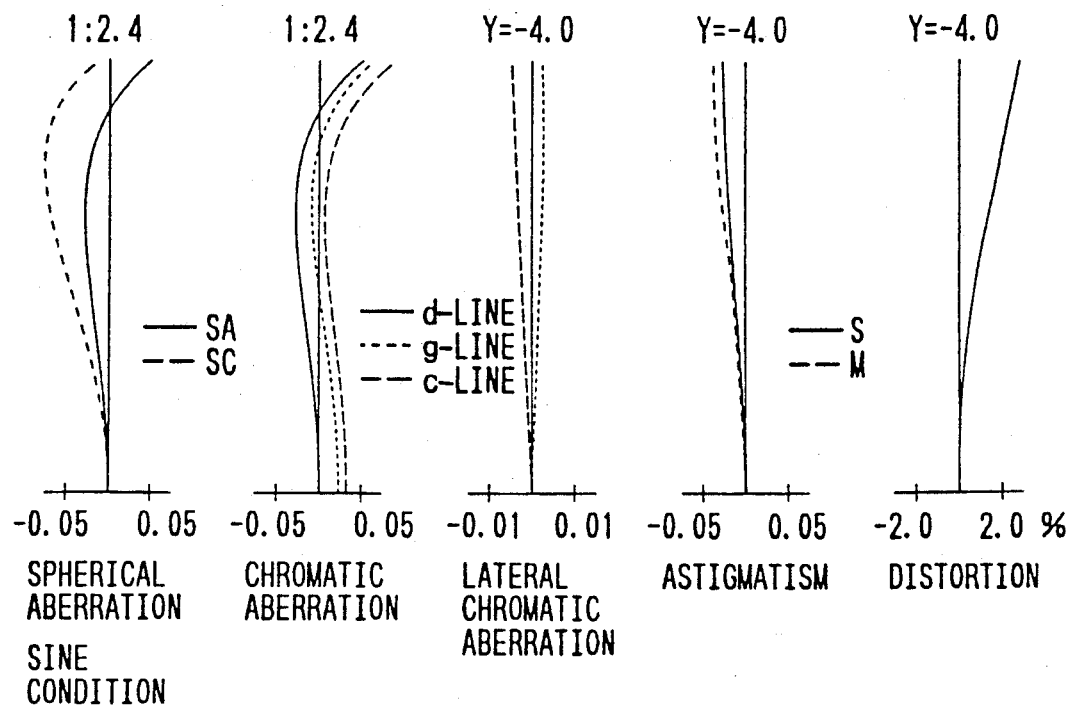
FIG. 22 is graphs showing aberrations of Example 8 at the focal length of 40 mm without the correcting lens.

Numerial data of the eighth exafmple are shown in Table 8. FIGS. 20, 21 and 22 show various aberrations at the focal lengths of 10 mm, 20 mm and 40 mm, respectively.

Figure 23:
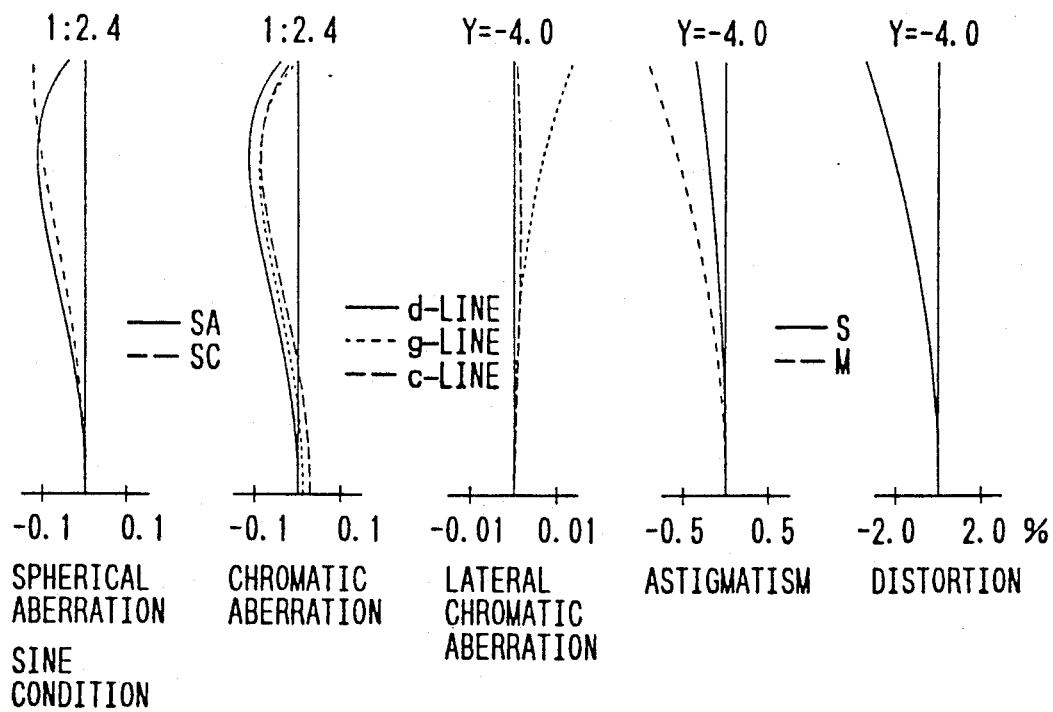
FIG. 23 is graphs showing aberrations of the overall lens system of Example 9 at the focal length of 10 mm.
Figure 24:
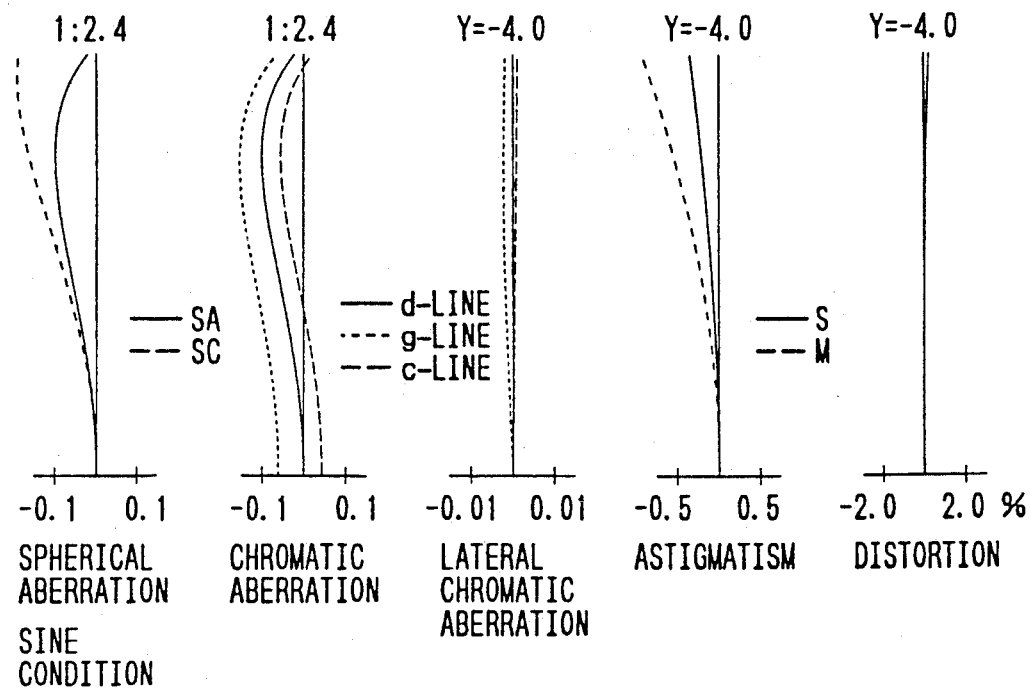
FIG. 24 is graphs showing aberrations of the overall lens system of Example 9 at the focal length of 20 mm.
Figure 25:
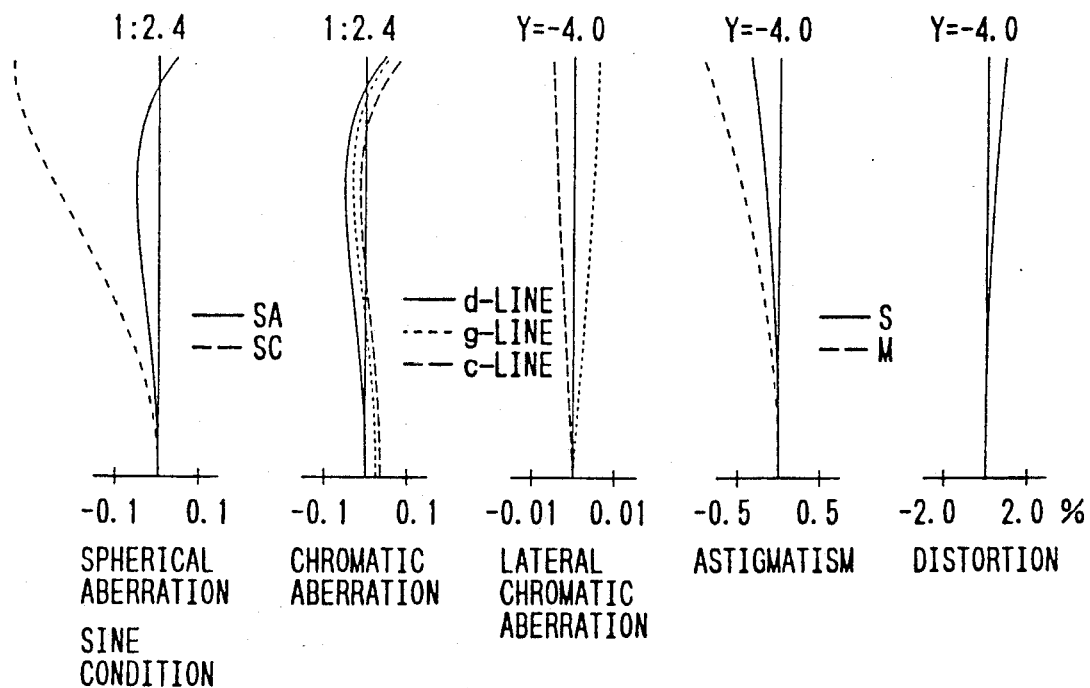
FIG. 25 is graphs showing the aberrations of the overall lens system of Example 8 at the focal length of 40 mm.

The avberrations of the imaging lens system without the correcting lens are shown in FIGS. 23, 24 and 25 at the focal lengths at 10 mm, 20 mm and 40 mm, respectively, for comparison.

TABLE 8

$F_{no}$ = 1:2.4
Stop position: 0.0 mm after fifteenth surface

| Surface No. | r | d | n | ν |
|---|---|---|---|---|
| 1 | 84.599 | 1.00 | 1.80518 | 25.4 |
| 2 | 39.340 | 7.00 | 1.62041 | 60.3 |
| 3 | −685.764 | 0.10 | | |
| 4 | 37.832 | 4.70 | 1.65830 | 57.3 |
| 5 | 144.178 | variable | | |
| 6 | 901.443 | 1.00 | 1.77250 | 49.6 |
| 7 | 11.335 | 3.77 | | |
| 8 | −68.435 | 1.00 | 1.77250 | 49.6 |
| 9 | 29.457 | 0.00 | | |
| 10 | 18.251 | 2.80 | 1.80518 | 25.4 |
| 11 | 243.228 | variable | | |
| 12 | −18.903 | 1.00 | 1.80518 | 25.4 |
| 13 | −23.741 | variable | | |

TABLE 8-continued $F_{no} = 1:2.4$
Stop position: 0.0 mm after fifteenth surface

| | | | | |
|---|---|---|---|---|
| 14 | 14.625 | 2.00 | 1.77250 | 49.6 |
| 15 | −78.864 | 6.60 | | |
| 16 | −9.569 | 1.00 | 1.80518 | 25.4 |
| 17 | 49.906 | 0.35 | | |
| 18 | −663.895 | 3.00 | 1.77250 | 49.6 |
| 19 | −13.600 | 0.00 | | |
| 20 | 20.299 | 3.00 | 1.69680 | 55.5 |
| 21 | −86.820 | 10.66 | | |
| 22 | 12.131 | 2.00 | 1.49176 | 57.4 |
| 23 | 11.433 | | | |

Asphericity coefficient:

| 22nd surface | 23rd surface |
|---|---|
| $K = -0.23580000 \times 10$ | $K = -0.86670000$ |
| $A_4 = -0.46588125 \times 10^{-3}$ | $A_4 = -0.53498250 \times 10^{-3}$ |
| $A_6 = -0.19610156 \times 10^{-4}$ | $A_6 = -0.14864906 \times 10^{-4}$ |
| $A_8 = 0.22914219 \times 10^{-6}$ | $A_8 = -0.76494844 \times 10^{-6}$ |
| $A_{10} = -0.20033789 \times 10^{-7}$ | $A_{10} = 0.98121094 \times 10^{-8}$ |

| | | | |
|---|---|---|---|
| ω | 22.2° | 11.1° | 5.6° |
| f | 10.00 | 20.00 | 40.00 |
| $d_5$ | 1.00 | 15.21 | 24.89 |
| $d_{11}$ | 24.85 | 1.00 | 1.00 |
| $d_{13}$ | 1.00 | 10.67 | 0.98 |

EXAMPLE 9

Figure 26:
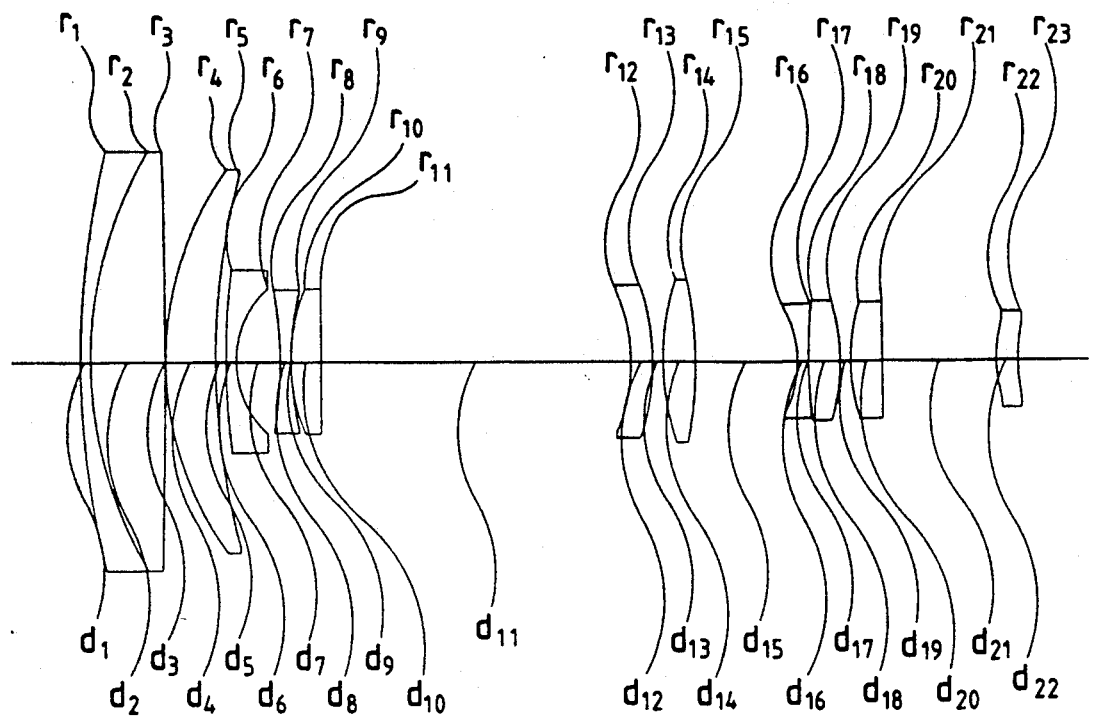
FIG. 26 is a sectional view showing a lens system according to Example 9 at the focal length of 8 mm.

FIG. 26 shows an imaging system according to Example 9. The system is composed of a four lens group imaging lens and a correcting lens having aspherical surfaces on both sides and a negative focal length in the paraxial area. The imaging lens is composed of a positive first lens group, a negative second lens group, a negative third lens group and a positive fourth lens group. The second and third lens groups are moved in the axial direction to thereby change the focal length, whereas the first lens group is moved in the axial direction to effect focusing.

Figure 27:
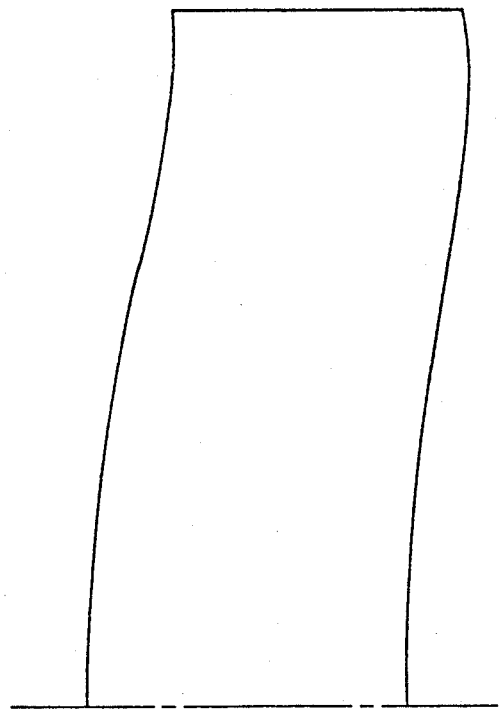
FIG. 27 is an enlarged view showing the correcting lens according to Example 9.

FIG. 27 is an enlarged view showing the correcting lens.

Figure 28:
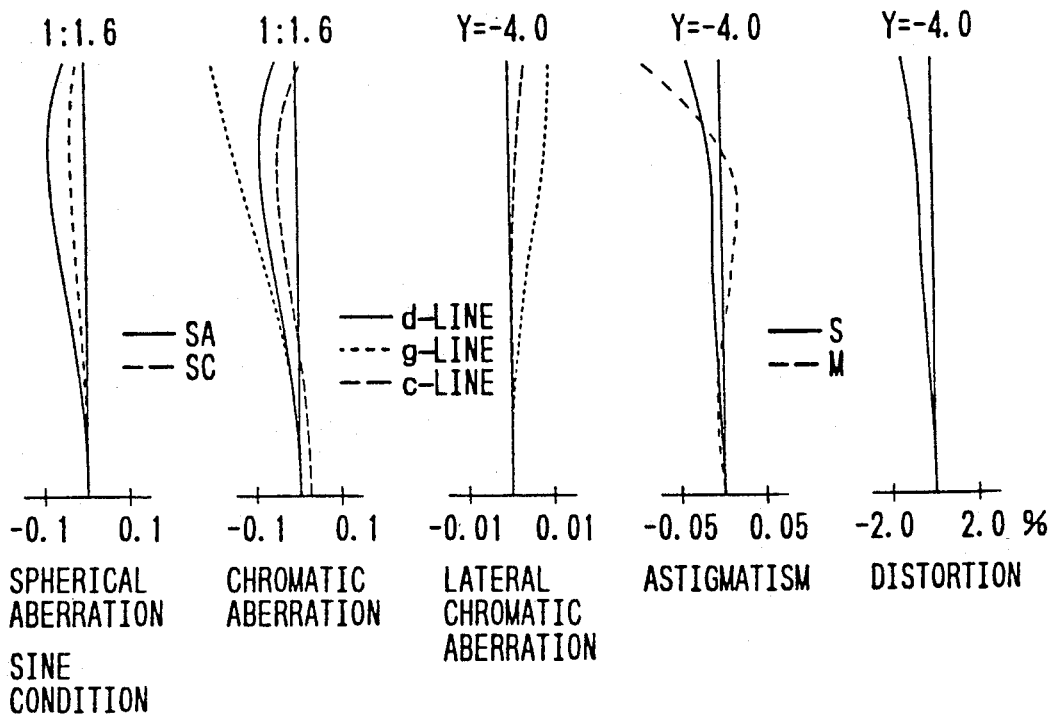
FIG. 28 is graphs showing aberrations of Example 9 at the focal length of 8 mm.
Figure 29:
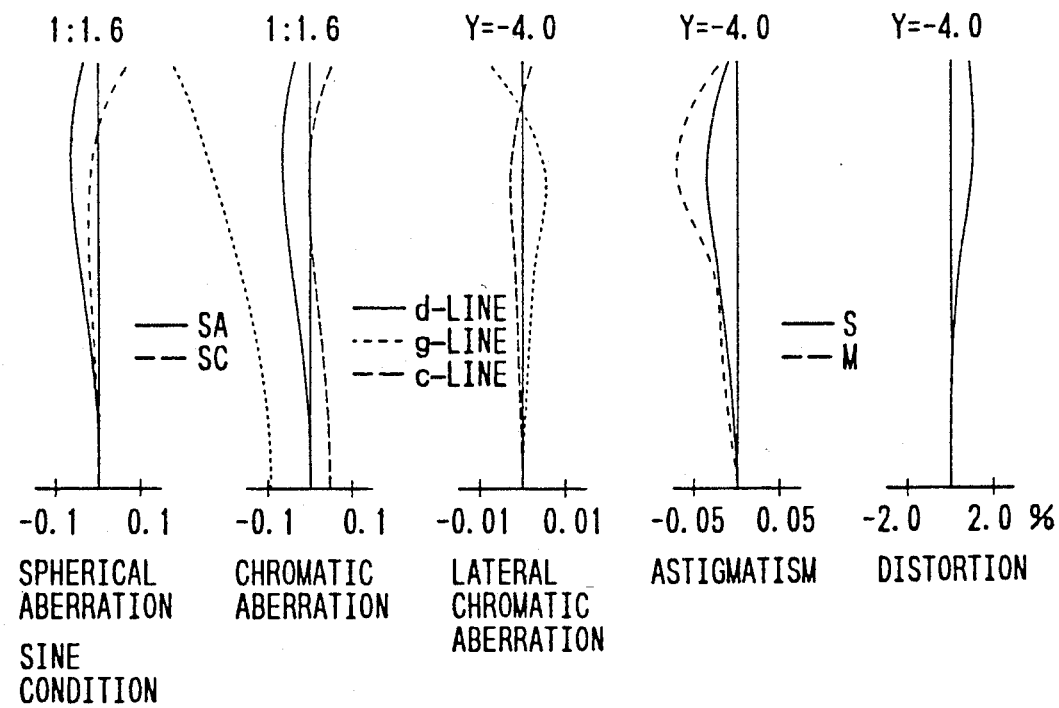
FIG. 29 is graphs showing aberrations of Example 9 at the focal length of 20 mm.
Figure 30:
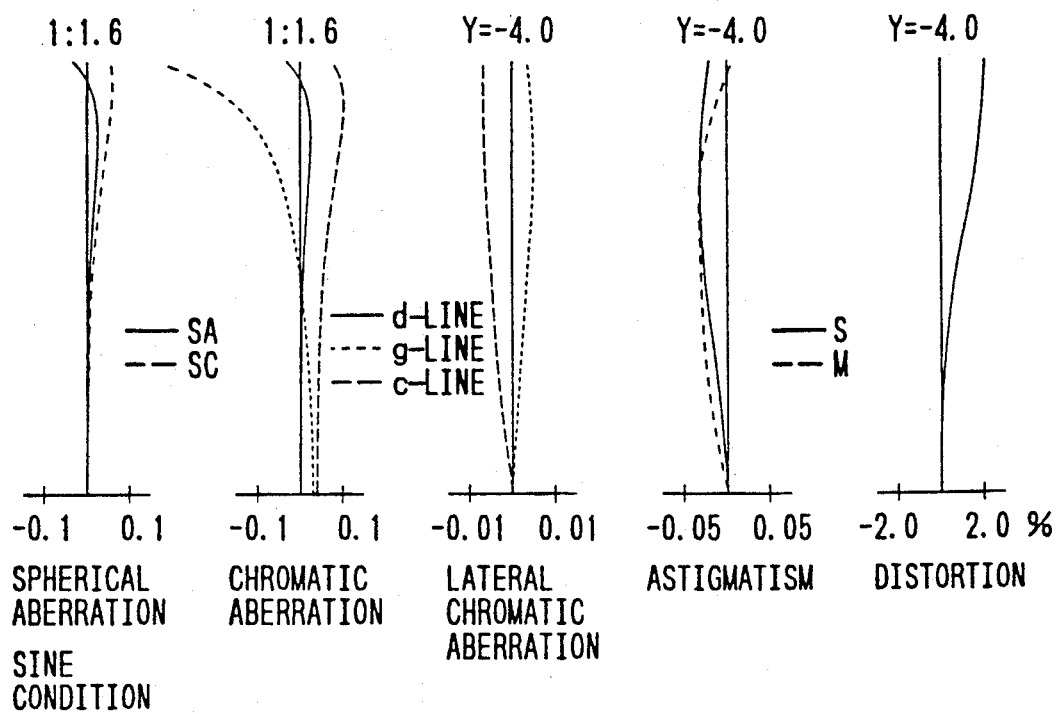
FIG. 30 is graphs showing aberrations of Example 9 at the focal length of 48 mm.

Numerical data of Example 9 are shown in Table 9. The various aberrations are shown at the focal lengths of 8 mm, 20 mm and 48 mm, respectively, in FIGS. 28, 29 and 30.

TABLE 9

$F_{no} = 1:1.6$
Stop position: 0.0 mm after fifteenth surface

| Surface No. | r | d | n | ν |
|---|---|---|---|---|
| 1 | 76.224 | 1.00 | 1.80518 | 25.4 |
| 2 | 36.696 | 7.00 | 1.62041 | 60.3 |
| 3 | −824.046 | 0.10 | | |
| 4 | 29.356 | 4.70 | 1.65830 | 57.3 |
| 5 | 63.288 | variable | | |
| 6 | 62.941 | 1.00 | 1.77250 | 49.6 |
| 7 | 8.965 | 4.06 | | |
| 8 | −37.332 | 1.00 | 1.77250 | 49.6 |
| 9 | 26.689 | 0.00 | | |
| 10 | 16.973 | 2.80 | 1.80518 | 25.4 |
| 11 | 4316.651 | variable | | |
| 12 | −15.738 | 2.00 | 1.80518 | 25.4 |
| 13 | −21.661 | variable | | |
| 14 | 23.378 | 3.00 | 1.80400 | 46.6 |
| 15 | −36.426 | 9.59 | | |
| 16 | −9.856 | 1.00 | 1.80518 | 25.4 |
| 17 | 63.901 | 0.00 | | |
| 18 | 39.059 | 3.00 | 1.77250 | 49.6 |
| 19 | −18.435 | 0.92 | | |
| 20 | 17.066 | 3.00 | 1.69680 | 55.5 |
| 21 | −876.505 | 10.70 | | |
| 22 | 10.515 | 2.00 | 1.49176 | 57.4 |
| 23 | 14.299 | | | |

Asphericity coefficient:

TABLE 9-continued $F_{no} = 1:1.6$
Stop position: 0.0 mm after fifteenth surface

| 22nd surface | 23rd surface |
|---|---|
| $K = -0.11902000 \times 10$ | $K = 0.20351000 \times 10$ |
| $A_4 = -0.34344375 \times 10^{-3}$ | $A_4 = -0.39248625 \times 10^{-3}$ |
| $A_6 = -0.21543063 \times 10^{-4}$ | $A_6 = 0.16765094 \times 10^{-4}$ |
| $A_8 = 0.87141406 \times 10^{-7}$ | $A_8 = -0.36826641 \times 10^{-5}$ |
| $A_{10} = -0.47653125 \times 10^{-7}$ | $A_{10} = 0.47951758 \times 10^{-7}$ |

| | | | |
|---|---|---|---|
| ω | 26.9° | 11.2° | 4.7° |
| f | 8.00 | 20.00 | 48.00 |
| $d_5$ | 1.00 | 18.15 | 28.09 |
| $d_{11}$ | 29.08 | 2.42 | 1.99 |
| $d_{13}$ | 1.00 | 10.51 | 1.00 |

EXAMPLE 10

Figure 31:
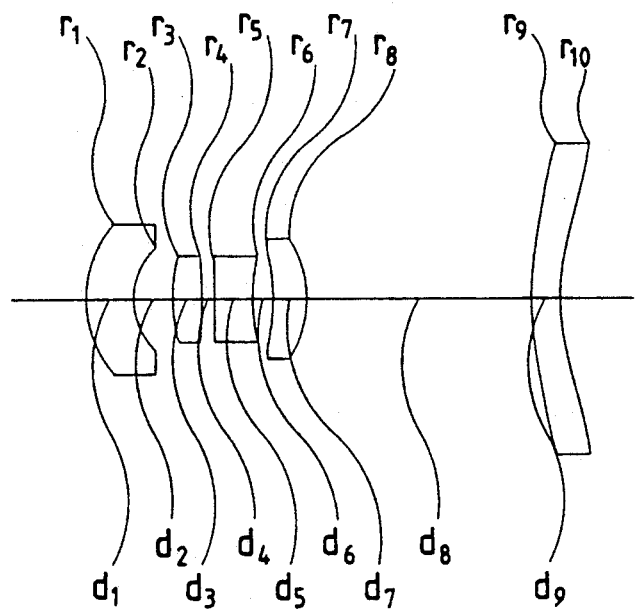
FIG. 31 is a sectional view of a lens system according to Example 10.

FIG. 31 shows a lens system according to Example 10. The system is composed of a four lens group imaging lens and a correcting lens having aspherical surfaces on both sides and a negative focal length in the paraxial area. The imaging lens is composed, in order from the object side, of a negative first lens, a positive second lens, a negative third lens and a positive fourth lens.

Figure 32:
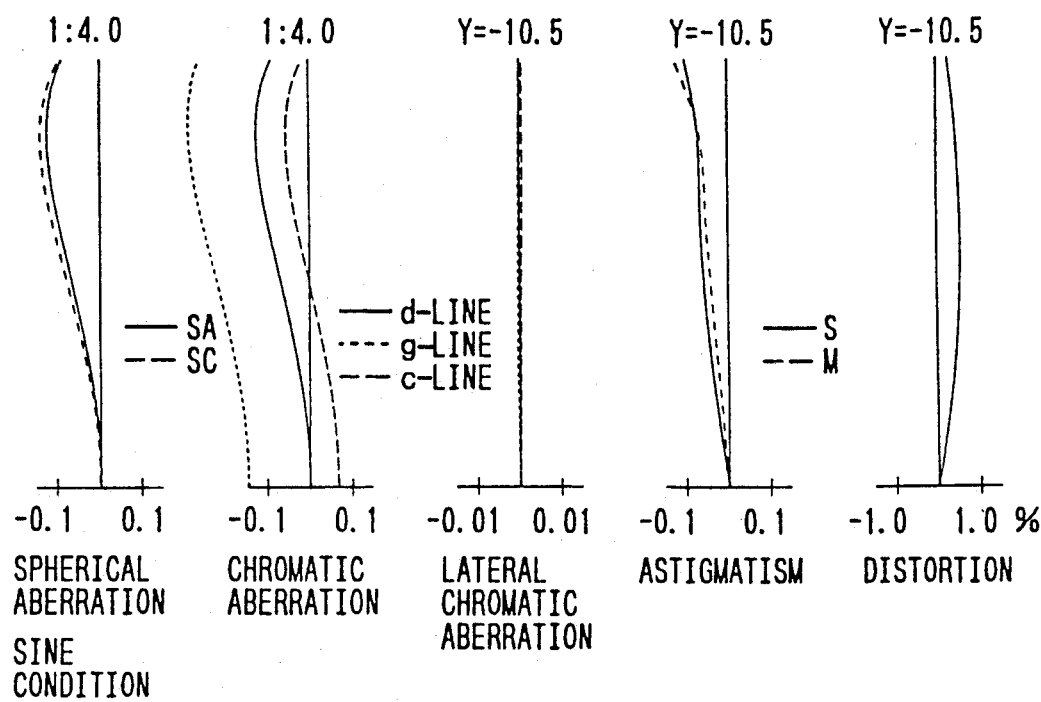
FIG. 32 is graphs showing aberrations of Example 10 at the magnification of −0.168.

Numerical data of the system are shown in Table 10. Various aberrations at magnification of −0.168 are shown in FIG. 32.

TABLE 10

$F_{no} = 1:4.0$  $f = 20.04$  $\omega = 24.2°$
Stop position: 0.22 mm after fourth surface

| Surface No. | r | d | n | ν |
|---|---|---|---|---|
| 1 | 7.500 | 3.26 | 1.48749 | 70.2 |
| 2 | 4.746 | 2.58 | | |
| 3 | 11.113 | 1.96 | 1.80400 | 46.6 |
| 4 | −35.721 | 0.85 | | |
| 5 | −162.033 | 2.55 | 1.84666 | 23.9 |
| 6 | 12.416 | 1.39 | | |
| 7 | −13.297 | 2.28 | 1.77250 | 49.6 |
| 8 | −7.268 | 15.20 | | |
| 9 | 18.690 | 2.00 | 1.49176 | 57.4 |
| 10 | 13.737 | | | |

Asphericity coefficient:

| 9th surface | 10th surface |
|---|---|
| $K = 0.12140000$ | $K = -0.87000000 \times 10^{-1}$ |
| $A_4 = -0.24887700 \times 10^{-3}$ | $A_4 = -0.26318100 \times 10^{-3}$ |
| $A_6 = 0.12765700 \times 10^{-5}$ | $A_6 = 0.43894000 \times 10^{-6}$ |
| $A_8 = -0.10093400 \times 10^{-8}$ | $A_8 = -0.63861200 \times 10^{-9}$ |
| $A_{10} = 0.00000000$ | $A_{10} = 0.00000000$ |

EXAMPLE 11

Figure 33:
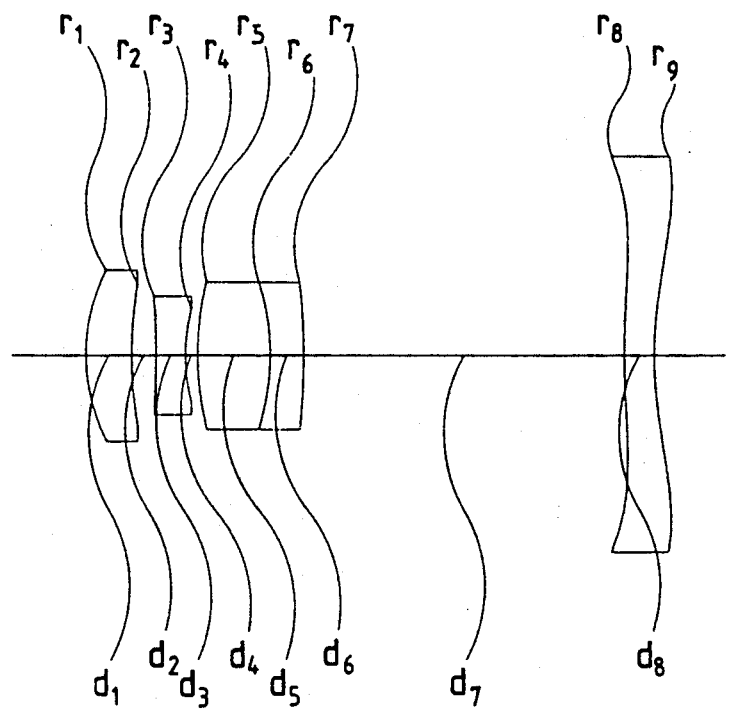
FIG. 33 is a sectional view showing a lens system of Example 11 at the focal length of 10 mm.

FIG. 33 shows an eleventh example of the invention. The lens system is composed of a four lens imaging lens and a correcting lens having a negative focal length in the paraxial area and aspherical surfaces on both sides. The imaging lens system is composed, in order from the object side, of a positive first lens, a negative second lens, a positive third lens and a negative fourth lens. The third and fourth lens elements are bonded or cemented together.

Figure 34:
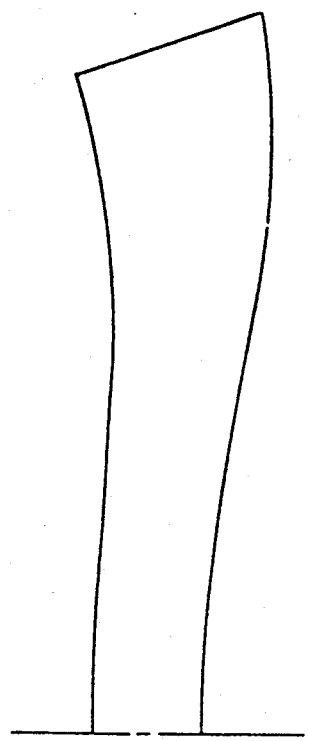
FIG. 34 is an enlarged sectional view showing the correcting lens according to Example 11.
Figure 35:
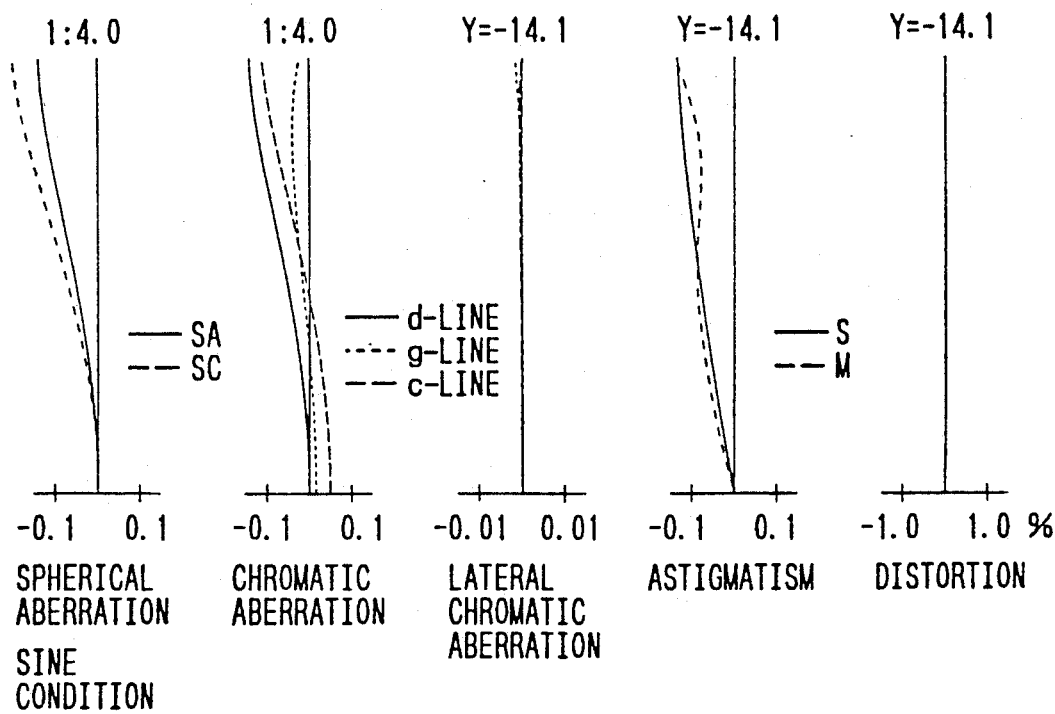
FIG. 35 is graphs showing aberrations of Example 11 at the magnification of −0.112.
Figure 36:
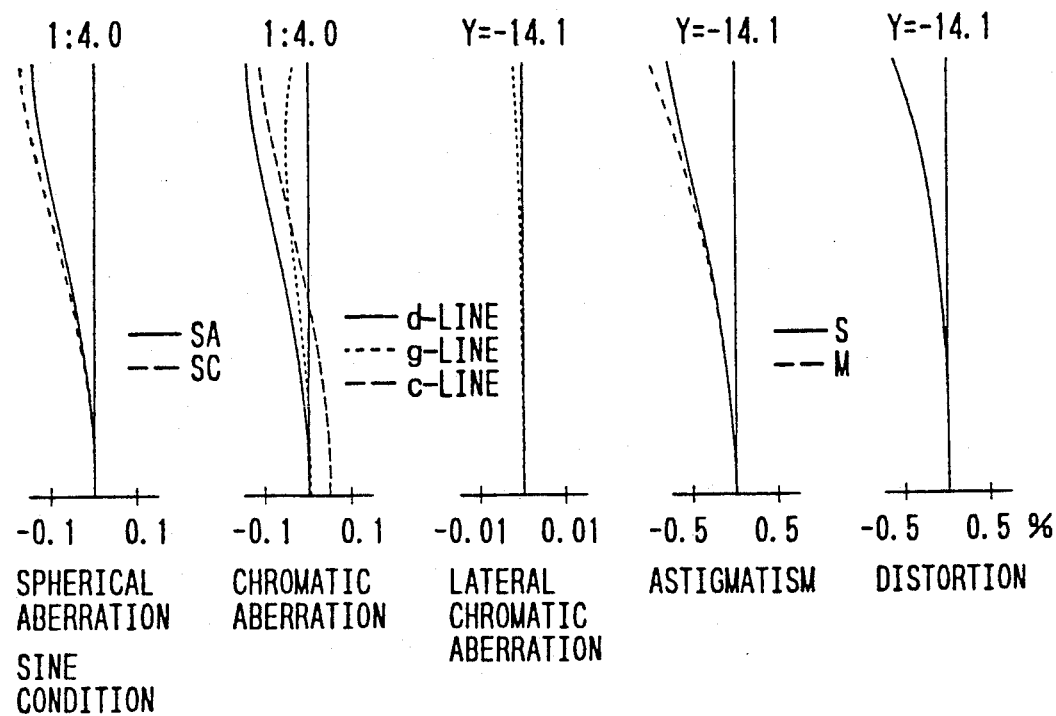
FIG. 36 is graphs showing aberrations of the system of Example 11 without the correcting lens.

FIG. 34 is an enlarged view showing a shape of the correcting lens. The numerical data of the lens are shown in Table 11. FIG. 35 shows a various aberrations at magnification of −0.112. FIG. 36 shows the aberrations of the imaging lens system without correcting lens.

TABLE 11

$F_{no} = 1:4.0$  $f = 30.05$  $\omega = 22.9°$
Stop position: 0.83 mm after fourth surface

| Surface No. | r | d | $n_d$ | $\nu$ |
|---|---|---|---|---|
| 1 | 12.541 | 3.14 | 1.83481 | 42.7 |
| 2 | 27.329 | 1.65 | | |
| 3 | −54.425 | 2.00 | 1.76182 | 26.6 |
| 4 | 11.764 | 0.86 | | |
| 5 | 20.318 | 2.91 | 1.83481 | 42.7 |
| 6 | −15.882 | 2.30 | 1.54814 | 45.8 |
| 7 | −48.458 | 22.00 | | |
| 8 | 51.315 | 2.00 | 1.49176 | 57.4 |
| 9 | 25.915 | | | |

Asphericity coefficient:

| 8th surface | 9th surface |
|---|---|
| $K = -1.00000000 \times 10^{-3}$ | $K = 0.33000000 \times 10^{-2}$ |
| $A_4 = -0.10634600 \times 10^{-3}$ | $A_4 = -0.91343800 \times 10^{-4}$ |
| $A_6 = 0.11880200 \times 10^{-6}$ | $A_6 = 0.31772000 \times 10^{-7}$ |
| $A_8 = 0.00000000$ | $A_8 = 0.00000000$ |
| $A_{10} = 0.00000000$ | $A_{10} = 0.00000000$ |

EXAMPLE 12

Figure 37:
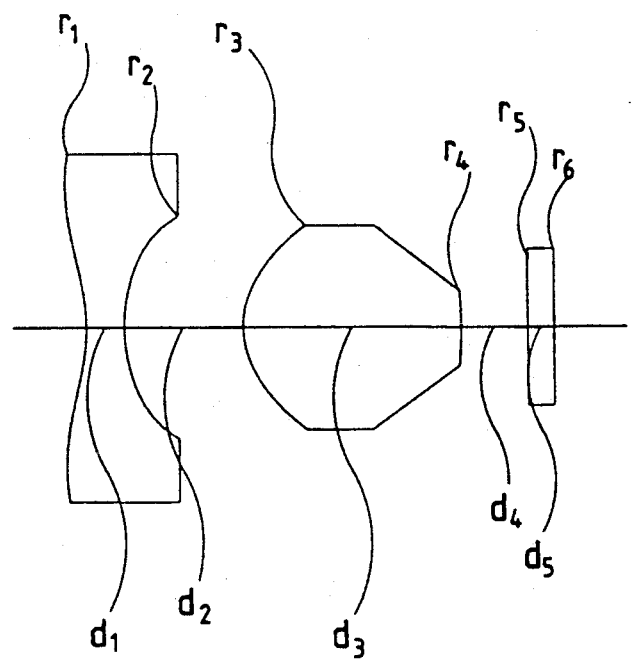
FIG. 37 is a sectional view showing a lens system according to Example 12.

FIG. 37 shows a twelfth example of the invention. The imaging lenses according to the twelfth to eighteenth examples are each composed, in order from the object side, of a correcting lens having a biconcave character is the paraxial area and having a negative focal length and a single positive imaging element. A cover glass is provided on the image side. The correcting lens has aspherical surfaces on both sides. The direction of shift from the spherical surface on the object side is opposite to the radius of curvature of the paraxial area.

With such an arrangement, it is possible to obtain a preferable image relative to the inlet pupil of the imaging lens with the aspherical surface on the object side of the correcting lens. The Petzval image surface is a curved surface toward the object assuming that the image surface of the imaging lens be an object. The Petzval image is formed on the object side beyond the correcting lens. The Petzval image surface of the negative correcting lens is a curved surface convex toward the object and is formed as a virtual image. In the case where these Petzval image positions and curvature are identical with each other, the image of the object is formed on the light-receiving surfaces without curvature of field or astigmatism.

With such an arrangement, it is possible to provide a compact and low cost lens with a wide-angle property with a simple structure. Also, by disposing the negative lens on the object side of the positive imaging lens, it is possible to insure a long backfocus. As a result, even if the focal length of the lens system is shortened, the lens is not brought into contact with the cover glass.

In Examples 12, 13, 14 and 16, the stop diaphragm is located in the imaging lens. In Examples 15, 17 and 18, the stop diaphragm is located on a plain on the image side of the imaging lens.

Figure 38:
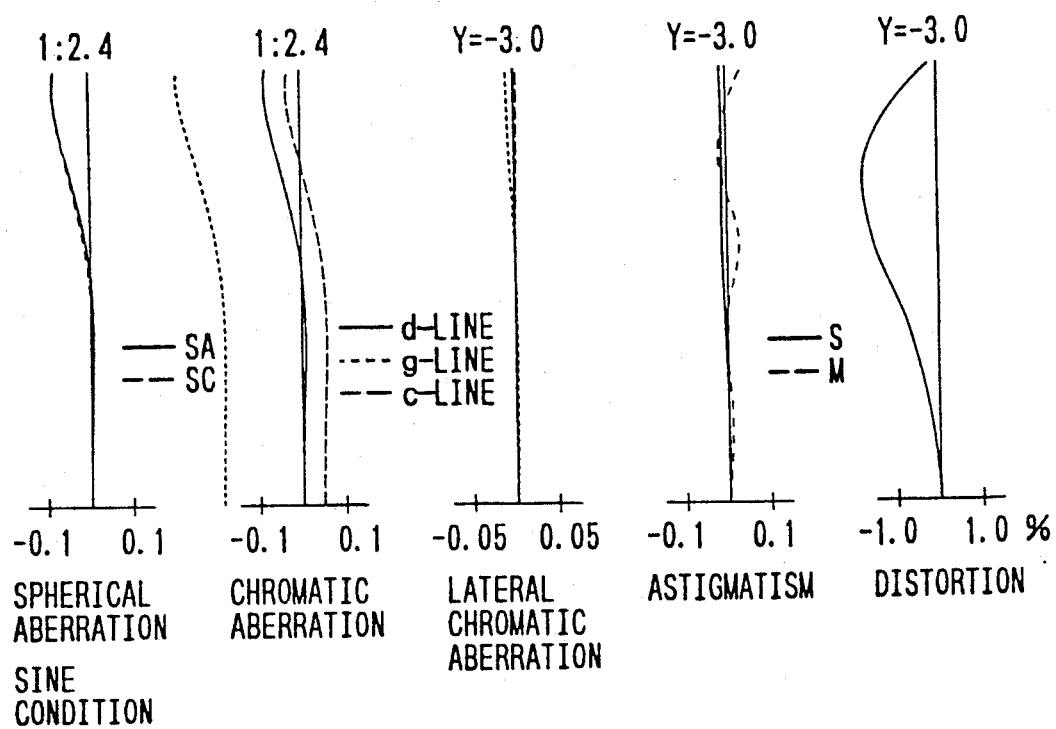
FIG. 38 is graphs showing aberrations according to Example 12.

The numerical data of Example 12 is shown in Table 12 and the aberrations are shown in FIG. 38.

TABLE 12

$F_{no} = 1:2.4$  $f = 3.61$  $\omega = 39.6°$
Stop position: 0.236 mm after fourth surface

| Surface No. | r | d | n | $\nu$ |
|---|---|---|---|---|
| 1 | −4.587 | 1.000 | 1.54510 | 54.3 |
| 2 | 3.949 | 3.183 | | |
| 3 | 2.207 | 5.884 | 1.54510 | 54.3 |
| 4 | −9.032 | 1.800 | | |
| 5 | ∞ | 0.700 | 1.51633 | 64.1 |
| 6 | ∞ | | | |

Asphericity coefficient:

| 1st surface | 2nd surface |
|---|---|
| $K = -0.402000$ | $K = 0.578900$ |
| $A_4 = 0.864316 \times 10^{-2}$ | $A_4 = -0.986545 \times 10^{-2}$ |
| $A_6 = -0.266607 \times 10^{-3}$ | $A_6 = 0.168617 \times 10^{-2}$ |
| $A_8 = 0.492237 \times 10^{-5}$ | $A_8 = -0.983242 \times 10^{-4}$ |
| $A_{10} = 0.000000$ | $A_{10} = 0.824091 \times 10^{-7}$ |
| 3rd surface | 4th surface |
| $K = -0.110790 \times 10$ | $K = -0.130980 \times 10$ |
| $A_4 = -0.780549 \times 10^{-3}$ | $A_4 = 0.209934 \times 10^{-1}$ |
| $A_6 = 0.374558 \times 10^{-3}$ | $A_6 = -0.165218 \times 10^{-1}$ |
| $A_8 = 0.000000$ | $A_8 = 0.118060 \times 10^{-1}$ |
| $A_{10} = 0.000000$ | $A_{10} = 0.000000$ |

EXAMPLE 13

Figure 39:
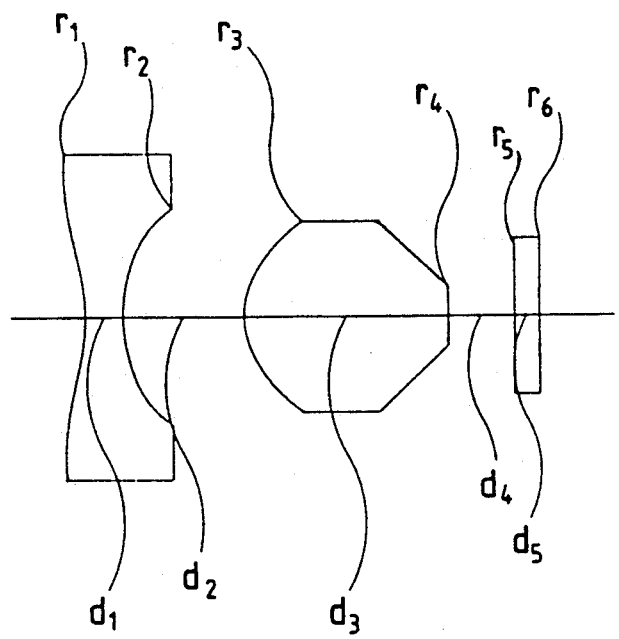
FIG. 39 is a sectional view showing a lens system according to Exasmple 13.
Figure 40:
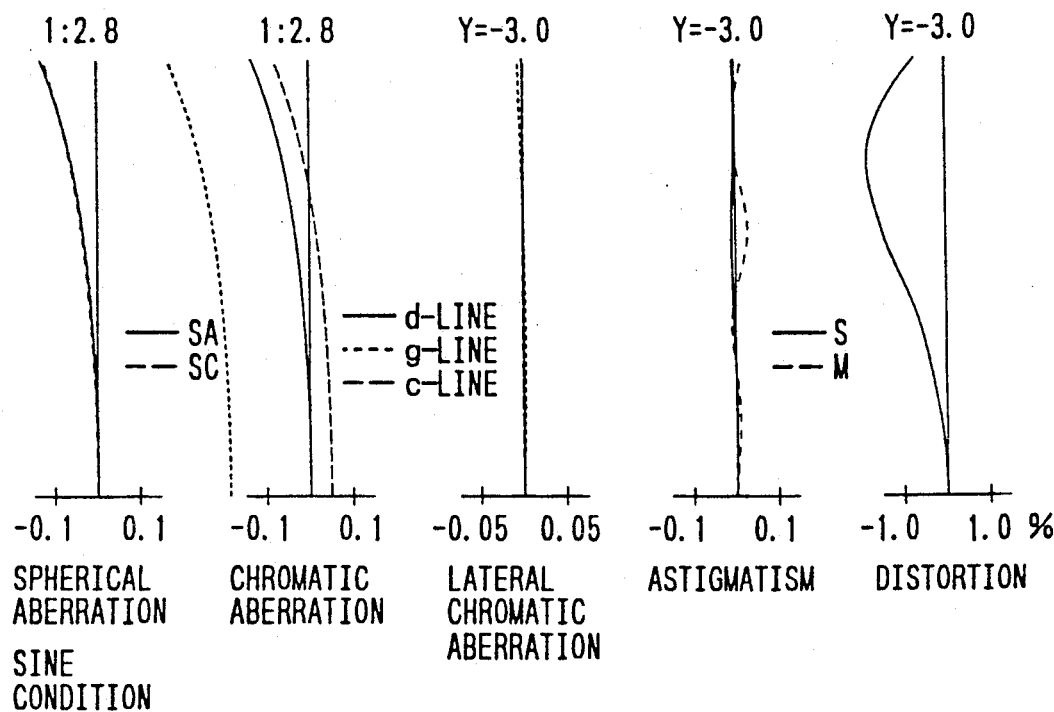
FIG. 40 is graphs showing aberrations of Example 13.

FIG. 39 shows the thirteenth example. The numerical data thereof is shown in Table 13. The aberrations are shown in FIG. 40.

TABLE 13

$F_{no} = 1:2.8$  $f = 3.60$  $\omega = 39.7°$
Stop position: 0.173 mm after fourth surface

| Surface No. | r | d | n | $\nu$ |
|---|---|---|---|---|
| 1 | −4.632 | 1.020 | 1.54510 | 54.3 |
| 2 | 3.959 | 3.235 | | |
| 3 | 2.119 | 5.496 | 1.54510 | 54.3 |
| 4 | −13.455 | 1.800 | | |
| 5 | ∞ | 0.700 | 1.51633 | 64.1 |
| 6 | ∞ | | | |

Asphericity coefficient:

| 1st surface | 2nd surface |
|---|---|
| $K = -0.356100$ | $K = 0.535400$ |
| $A_4 = 0.868733 \times 10^{-2}$ | $A_4 = -0.942661 \times 10^{-2}$ |
| $A_6 = -0.269543 \times 10^{-3}$ | $A_6 = 0.173404 \times 10^{-2}$ |
| $A_8 = 0.501075 \times 10^{-5}$ | $A_8 = -0.961295 \times 10^{-4}$ |
| $A_{10} = 0.000000$ | $A_{10} = 0.000000$ |
| 3rd surface | 4th surface |
| $K = -0.116240 \times 10$ | $K = -0.130980 \times 10$ |
| $A_4 = 0.805949 \times 10^{-3}$ | $A_4 = 0.157393 \times 10^{-1}$ |
| $A_6 = 0.447873 \times 10^{-3}$ | $A_6 = 0.115998 \times 10^{-2}$ |
| $A_8 = 0.000000$ | $A_8 = 0.000000$ |
| $A_{10} = 0.000000$ | $A_{10} = 0.000000$ |

EXAMPLE 14

Figure 41:
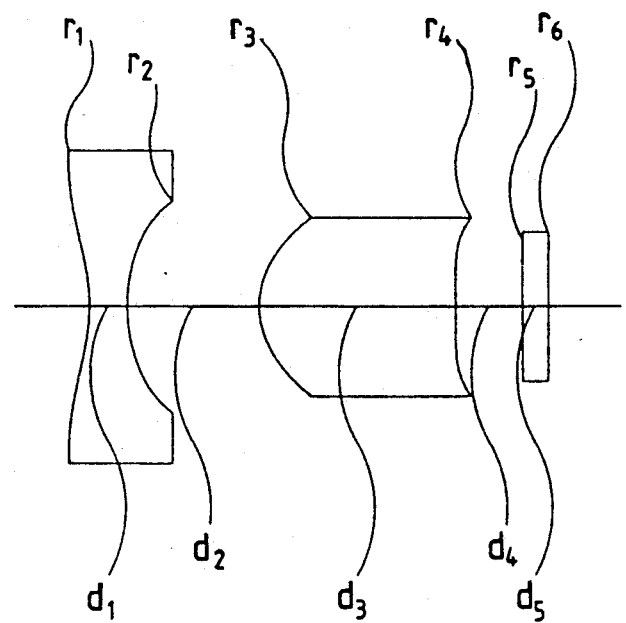
FIG. 41 is a sectional view showing a lens system according to Example 14.
Figure 42:
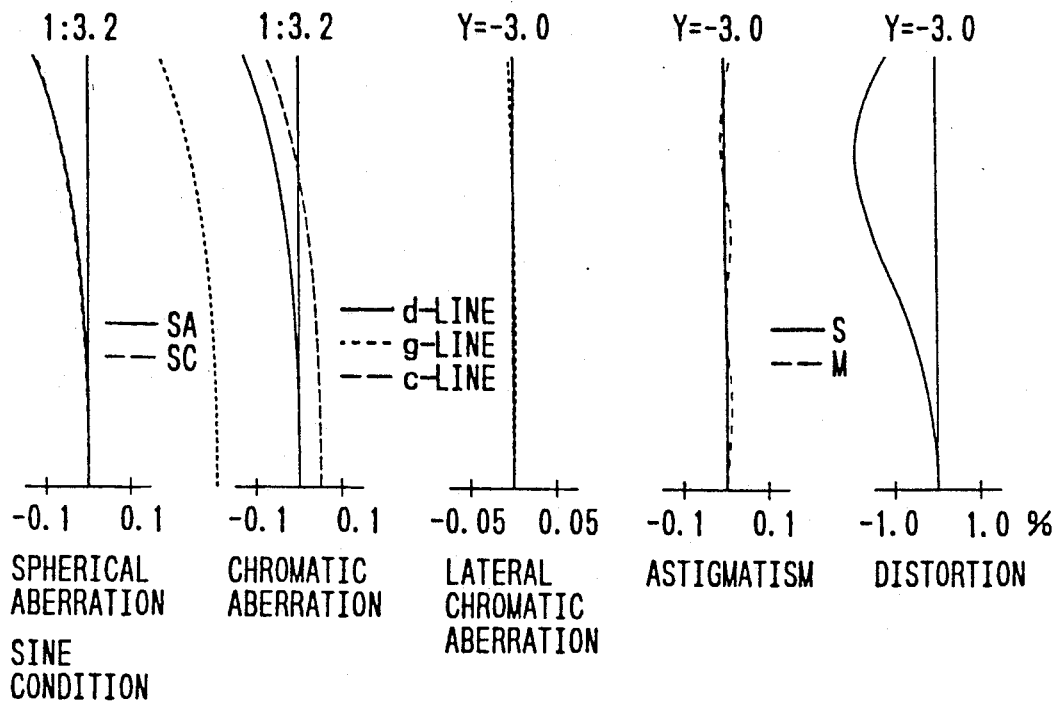
FIG. 42 is graphs showing the aberrations of Example 14.

FIG. 41 shows the fourteenth example. The numerical data thereof is shown in Table 14. The aberrations are shown in FIG. 42.

TABLE 14

$F_{no} = 1:3.2$  $f = 3.60$  $\omega = 39.7°$
Stop position: 0.235 mm after fourth surface

| Surface No. | r | d | n | $\nu$ |
|---|---|---|---|---|
| 1 | −4.678 | 1.000 | 1.54510 | 54.3 |
| 2 | 4.207 | 3.531 | | |
| 3 | 2.127 | 5.315 | 1.54510 | 54.3 |
| 4 | −23.109 | 1.800 | | |
| 5 | ∞ | 0.700 | 1.51633 | 64.1 |
| 6 | ∞ | | | |

Asphericity coefficient:

| 1st surface | 2nd surface |
|---|---|
| $K = -0.290700$ | $K = 0.753500$ |

TABLE 14-continued $F_{no} = 1:3.2$  $f = 3.60$  $\omega = 39.7°$
Stop position: 0.235 mm after fourth surface

| | |
|---|---|
| $A_4 = 0.869606 \times 10^{-2}$ | $A_4 = -0.753936 \times 10^{-2}$ |
| $A_6 = -0.281279 \times 10^{-3}$ | $A_6 = 0.146128 \times 10^{-2}$ |
| $A_8 = 0.570323 \times 10^{-5}$ | $A_8 = -0.861100 \times 10^{-4}$ |
| $A_{10} = 0.000000$ | $A_{10} = 0.000000$ |
| 3rd surface | 4th surface |
| $K = -0.122430 \times 10$ | $K = -0.130980 \times 10$ |
| $A_4 = 0.249318 \times 10^{-2}$ | $A_4 = 0.167431 \times 10^{-1}$ |
| $A_6 = 0.453902 \times 10^{-3}$ | $A_6 = 0.000000$ |
| $A_8 = 0.000000$ | $A_8 = 0.000000$ |
| $A_{10} = 0.000000$ | $A_{10} = 0.000000$ |

EXAMPLE 15

Figure 43:
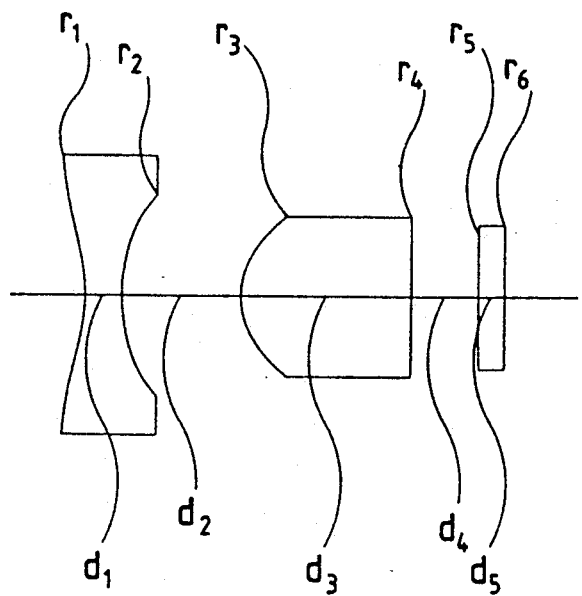
FIG. 43 is a sectional view showing a lens system according to Example 15.
Figure 44:
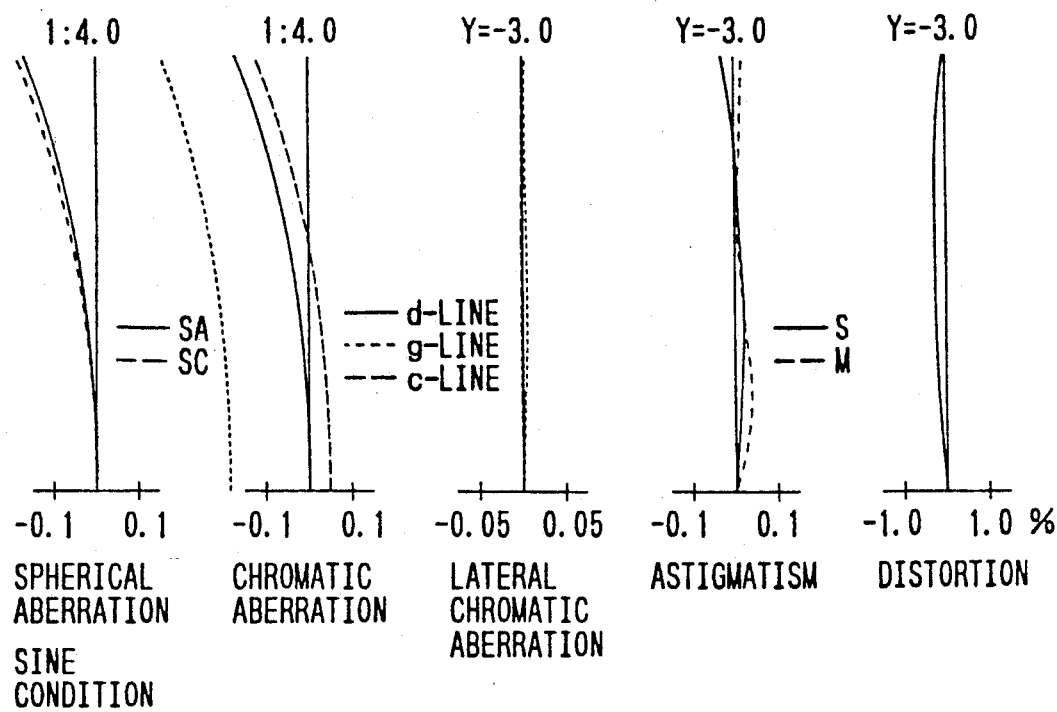
FIG. 44 is graphs showing the aberrations of Example 15.

FIG. 43 shows the fifteenth example. The numerical data thereof is shown in Table 15. The aberrations are shown in FIG. 44.

TABLE 15

$F_{no} = 1:4.0$  $f = 3.61$  $\omega = 39.6°$

| Surface No. | r | d | n | v |
|---|---|---|---|---|
| 1 | −4.444 | 1.007 | 1.54510 | 54.3 |
| 2 | 4.415 | 3.168 | | |
| 3 | 1.941 | 4.612 | 1.54510 | 54.3 |
| 4 | −265.553 | 1.800 | | |
| 5 | ∞ | 0.700 | 1.51633 | 64.1 |
| 6 | ∞ | | | |

Asphericity coefficient:

| 1st surface | 2nd surface |
|---|---|
| $K = -0.103200$ | $K = 0.648700$ |
| $A_4 = 0.102554 \times 10^{-1}$ | $A_4 = -0.842680 \times 10^{-2}$ |
| $A_6 = -0.370471 \times 10^{-3}$ | $A_6 = 0.184347 \times 10^{-2}$ |
| $A_8 = 0.967851 \times 10^{-5}$ | $A_8 = -0.110813 \times 10^{-3}$ |
| $A_{10} = 0.000000$ | $A_{10} = 0.000000$ |
| 3rd surface | |
| $K = -0.113200 \times 10$ | |
| $A_4 = 0.130254 \times 10^{-2}$ | |
| $A_6 = 0.863731 \times 10^{-3}$ | |
| $A_8 = 0.000000$ | |
| $A_{10} = 0.000000$ | |

EXAMPLE 16

Figure 45:
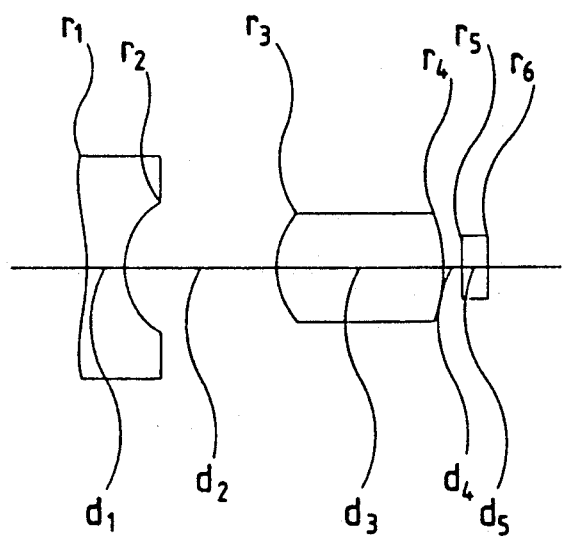
FIG. 45 is a sectional view showing a lens system according to Example 16.
Figure 46:
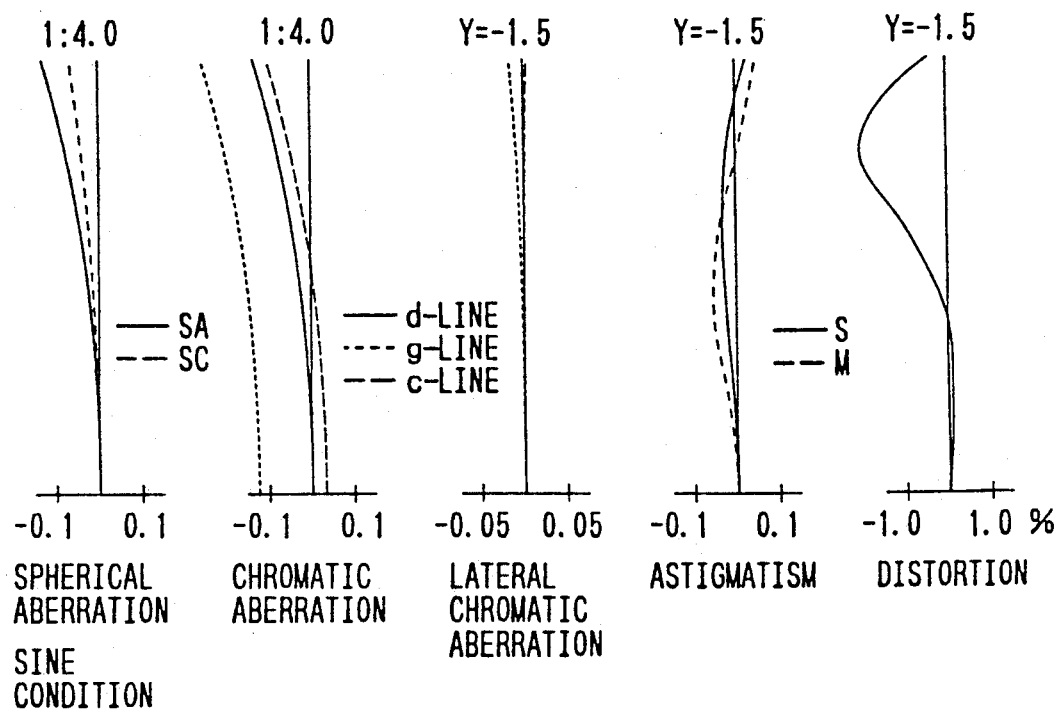
FIG. 46 is graphs showing the aberrations of Example 16.

FIG. 45 shows the sixteenth example. The numerical data thereof is shown in Table 16. The aberrations are shown in FIG. 46.

TABLE 16

$F_{no} = 1:4.0$  $f = 1.80$  $\omega = 39.7°$
Stop position: 0.656 mm after fourth surface

| Surface No. | r | d | n | v |
|---|---|---|---|---|
| 1 | −5.168 | 1.000 | 1.54510 | 54.3 |
| 2 | 2.028 | 4.087 | | |
| 3 | 1.987 | 4.488 | 1.54510 | 54.3 |
| 4 | −4.271 | 0.500 | | |
| 5 | ∞ | 0.700 | 1.51633 | 64.1 |
| 6 | ∞ | | | |

Asphericity coefficient:

| 1st surface | 2nd surface |
|---|---|
| $K = 0.324000 \times 10^{-1}$ | $K = 0.153200$ |
| $A_4 = 0.134250 \times 10^{-1}$ | $A_4 = -0.265704 \times 10^{-1}$ |
| $A_6 = -0.570018 \times 10^{-3}$ | $A_6 = 0.700370 \times 10^{-2}$ |
| $A_8 = 0.195283 \times 10^{-4}$ | $A_8 = -0.918400 \times 10^{-3}$ |
| $A_{10} = 0.000000$ | $A_{10} = 0.000000$ |
| 4th surface | |
| $K = -0.882300$ | |
| $A_4 = -0.121141 \times 10^{-2}$ | |
| $A_6 = 0.196613 \times 10^{-2}$ | |
| $A_8 = 0.000000$ | |

TABLE 16-continued $F_{no} = 1:4.0$  $f = 1.80$  $\omega = 39.7°$
Stop position: 0.656 mm after fourth surface $A_{10} = 0.000000$

EXAMPLE 17

Figure 47:
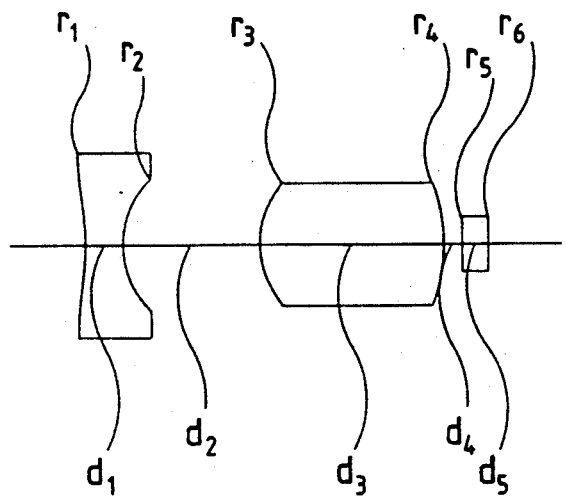
FIG. 47 is a sectional view showing the system according to Example 17.
Figure 48:
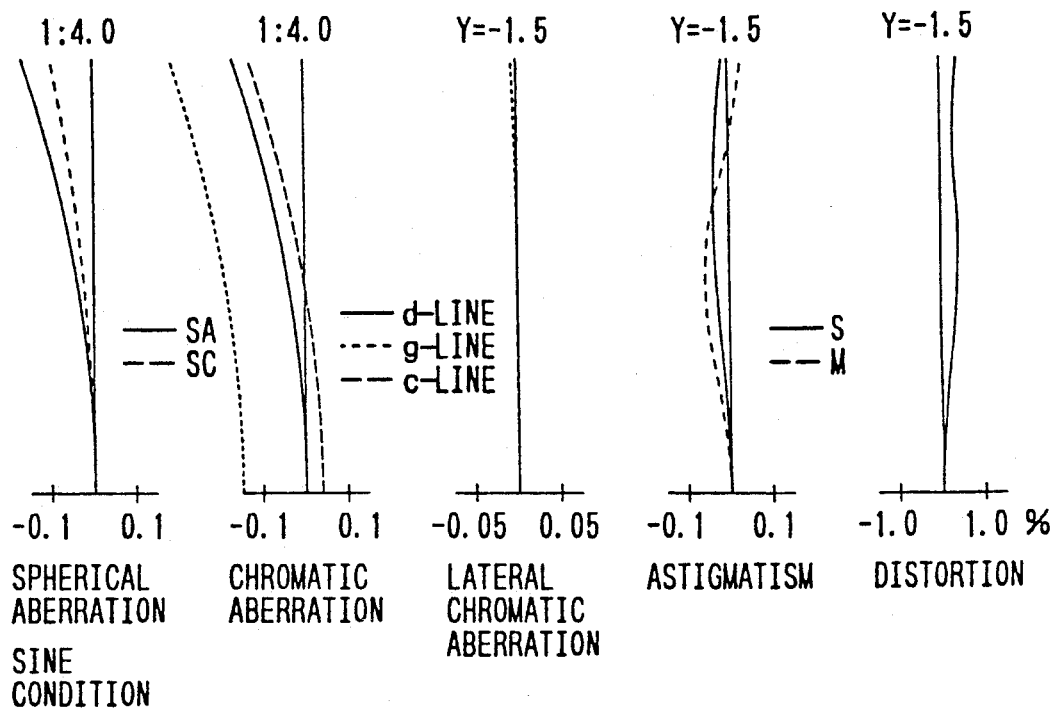
FIG. 48 is graphs showing the aberrations of Example 17.

FIG. 47 shows the seventheenth example. The numerical data thereof is shown in Table 17. The aberrations are shown in FIG. 48.

TABLE 17

$F_{no} = 1:4.0$  $f = 2.43$  $\omega = 31.6°$
Stop position: 0.236 mm after fourth surface

| Surface No. | r | d | n | v |
|---|---|---|---|---|
| 1 | −6.091 | 1.000 | 1.54510 | 54.3 |
| 2 | 2.350 | 3.708 | | |
| 3 | 2.219 | 4.964 | 1.54510 | 54.3 |
| 4 | −4.684 | 0.500 | | |
| 5 | ∞ | 0.700 | 1.51633 | 64.1 |
| 6 | ∞ | | | |

Asphericity coefficient:

| 1st surface | 2nd surface |
|---|---|
| $K = 0.154000 \times 10^{-1}$ | $K = -0.152200$ |
| $A_4 = 0.123166 \times 10^{-1}$ | $A_4 = -0.990593 \times 10^{-2}$ |
| $A_6 = -0.790303 \times 10^{-3}$ | $A_6 = 0.415368 \times 10^{-2}$ |
| $A_8 = 0.265373 \times 10^{-4}$ | $A_8 = -0.562239 \times 10^{-3}$ |
| $A_{10} = 0.000000$ | $A_{10} = 0.000000$ |
| 3rd surface | |
| $K = -0.938200$ | |
| $A_4 = -0.917848 \times 10^{-3}$ | |
| $A_6 = 0.000000$ | |
| $A_8 = 0.000000$ | |
| $A_{10} = 0.000000$ | |

EXAMPLE 18

Figure 49:
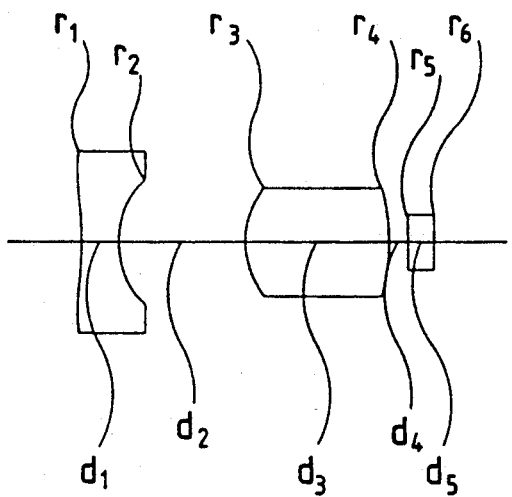
FIG. 49 is a sectional view showing a lens system according to Example 18.
Figure 50:
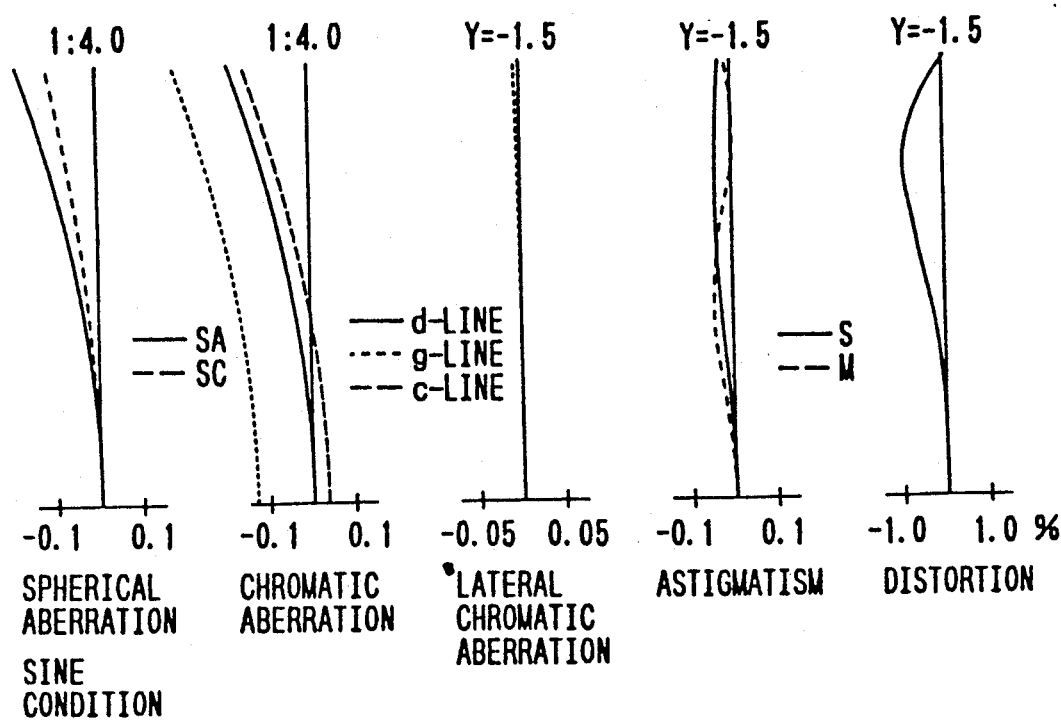
FIG. 50 is graphs showing aberrations of Example 18.
Figure 51:
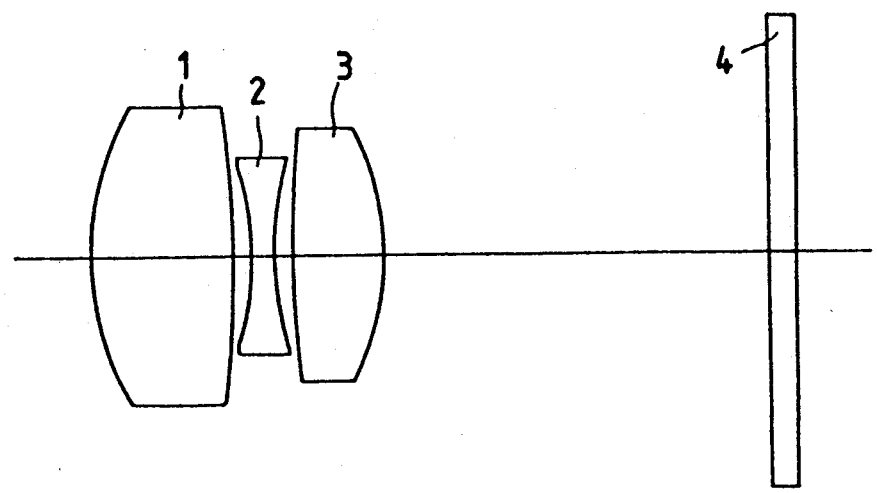
FIG. 51 is a simplified cross section of a prior art imaging lens system composed of three lens elements.
Figure 52:
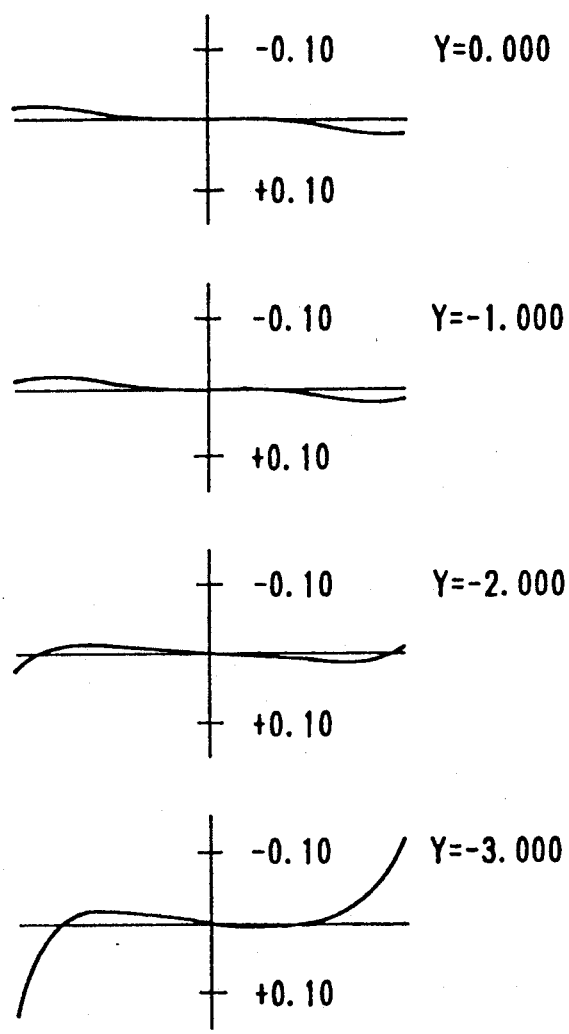
FIG. 52 is a set of graphs plotting the lateral aberration curves obtained with the lens system shown in FIG. 51.
Figure 53:
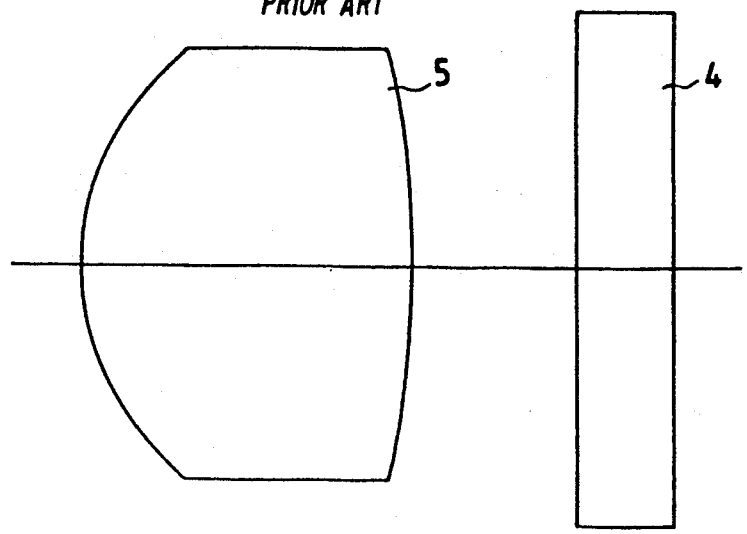
FIG. 53 is a simplified cross section of another prior art imaging lens system composed of a single lens element.
Figure 54:
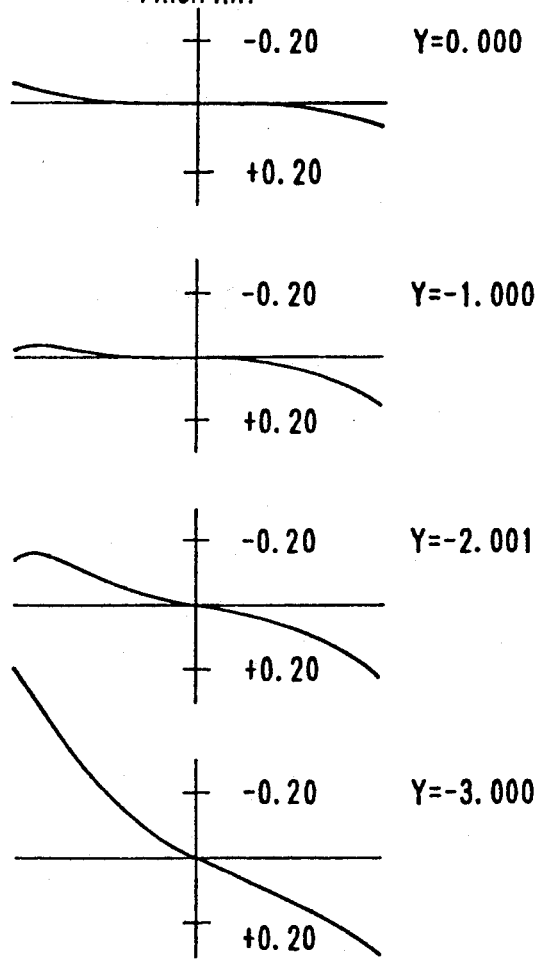
FIG. 54 is a set of graphs plotting the lateral aberration curves obtained with the lens system shown in FIG. 53.

FIG. 49 shows the eighteenth example. The numerical data thereof is shown in Table 18. The aberrations are shown in FIG. 50.

TABLE 18

$F_{no} = 1:4.0$  $f = 2.43$  $\omega = 31.6°$

| Surface No. | r | d | n | v |
|---|---|---|---|---|
| 1 | −6.653 | 1.000 | 1.54510 | 54.3 |
| 2 | 2.503 | 3.402 | | |
| 3 | 2.031 | 3.888 | 1.54510 | 54.3 |
| 4 | −5.129 | 0.500 | | |
| 5 | ∞ | 0.700 | 1.51633 | 64.1 |
| 6 | ∞ | | | |

Asphericity coefficient:

| 1st surface | 2nd surface |
|---|---|
| $K = -0.105000 \times 10^{-1}$ | $K = -0.132000 \times 10^{-1}$ |
| $A_4 = 0.149108 \times 10^{-1}$ | $A_4 = 0.151142 \times 10^{-2}$ |
| $A_6 = -0.797289 \times 10^{-3}$ | $A_6 = 0.540760 \times 10^{-2}$ |
| $A_8 = 0.193630 \times 10^{-4}$ | $A_8 = -0.165097 \times 10^{-3}$ |
| $A_{10} = 0.000000$ | $A_{10} = 0.000000$ |
| 3rd surface | |
| $K = -0.928400$ | |
| $A_4 = 0.217473 \times 10^{-2}$ | |
| $A_6 = 0.000000$ | |
| $A_8 = 0.000000$ | |
| $A_{10} = 0.000000$ | |

As described above, according to the invention, it is possible to simplify the imaging lens only with the correcting lens being aspherical surfaces on both sides and imaging lens.

What is claimed is:

1. An imaging lens system comprising a focusing lens and a correcting meniscus lens which is located on an image side of said focusing lens and which has on both sides aspherical surfaces each convex toward the object side in a paraxial area, wherein an object disposed perpendicular to an optical axis of said lens system is imaged on a light receiving element disposed perpendicular to the optical axis.

2. The imaging lens system according to claim 1 wherein an aspheric surface shifting direction of each surfaces of said correcting lens is opposite to a direction of a paraxial radius curvature of each surface.

3. The imaging lens system according to claim 1 wherein said correcting lens serves as a cover for a light receiving element provided on the image side of said correcting lens.

4. The imaging lens system according to claim 1 wherein said correcting lens element is formed of a low moisture absorption resin.

5. The imaging lens system according to claim 1 wherein said focusing lens is composed of a single lens element having at least one aspherical surface.

6. An imaging lens system comprising a focusing lens and a correcting meniscus lens which is located on an image side of said focusing lens and which has on both sides aspherical surfaces each convex toward the object side in a paraxial area;
    wherein said correcting lens serves as a cover for a light receiving element provided on the image side of said correcting lens; and
    wherein a focus adjustment is achieved by moving only said focusing lens in the axial direction.

7. An imaging lens system comprising a focusing lens and a correcting meniscus lens which is located on an image side of said focusing lens and which has on both sides aspherical surfaces each convex toward the object side in a paraxial area, wherein said correcting lens element is formed of an amorphous polyolefin.

8. An imaging lens system comprising a focusing lens and a correcting meniscus lens which is located on an image side of said focusing lens and which has on both sides aspherical surfaces each convex toward the object side in a paraxial area, wherein said focusing lens is composed, in order from the object side, a positive first lens unit, a negative second lens unit and a positive third lens unit, wherein said first and second lens units are moved in the axial direction to thereby change a focal length.

9. An imaging lens system comprising a focusing lens and a correcting meniscus lens which is located on an image side of said focusing lens and which has on both sides aspherical surfaces each convex toward the object side in a paraxial area, wherein said focusing lens is composed, in order from the object side, of a positive first lens unit, a negative second lens unit, a negative third lens unit and a positive fourth lens unit, wherein said second and third lens units are moved in the axial direction to thereby change a focal length.

10. An imaging lens system comprising a focusing lens and a correcting meniscus lens which is located on an image side of said focusing lens and which has on both sides aspherical surfaces each convex toward the object side in a paraxial area, wherein said focusing lens is composed, in order from the object side, of a negative first lens unit, a positive object side, of a negative first lens unit, a positive second lens unit, a negative third lens unit and a positive fourth lens unit.

11. An imaging lens system comprising a focusing lens and a correcting meniscus lens which is located on an image side of said focusing lens and which has on both sides aspherical surfaces each convex toward the object side in a paraxial area, wherein said focusing lens is composed, in order from the object side, of a positive first lens unit, a negative second lens unit, a positive third lens unit and a negative fourth lens unit, wherein said third lens unit and said fourth lens unit are cemented together.

12. An imaging lens system comprising a focusing lens element and a correcting lens element positioned on its image side and having an aspheric surface on both sides, which system further satisfies the following conditions:

$$0.75 < f/f_1 < 1.0$$

$$-0.10 < f/f_2 < 0$$

where f is the focal length of the overall system at a predominant wavelength, $f_1$ is the focal length of the focusing lens element, and $f_2$ is the focal length of the correcting lens element.

13. An imaging lens system comprising a focusing lens element and a correcting lens element positioned on its image side and having an aspheric surface on both sides, which system further satisfies the following condition:

$$0.3 < r_1/d_1 < 1.0$$

where $r_1$ is the paraxial radius of curvature of the first surface of the focusing lens element and $d_1$ is the on-axis thickness of the focusing lens element.

14. An imaging lens system comprising a focusing lens element and a correcting lens element positioned on its image side and having an aspheric surface on both sides, which system further satisfies the following conditions:

$$-1.0 \times 10^{-1} < \Delta X_1(0.2f)/f < -1.0 \times 10^{-3}$$

$$-1.0 \times 10^{-1} < \Delta X_2(0.2f)/f < -1.0 \times 10^{-3}$$

where f is the focal length of the overall system, assuming that $\Delta X_N(Y)$, or the deviation from a paraxial curved surface of a point of the aspheric object-side surface (N=1) or image-side surface (N=2) of the correcting lens element at height Y from the optical axis, is defined by the following equation:

$$\Delta Y_N(Y) = \frac{CY^2}{1 + \sqrt{1 - (1+K)C^2Y^2}} + \Sigma A_n Y^n - \frac{CY^2}{1 + \sqrt{1 - C^2Y^2}}$$

where An signifies the 4th, 6th, 8th, ... and nth order asphericity coefficients of lens; K is a conicity coefficient; and C is the curvature (1/r) of the apex of an aspheric surface.

15. An imaging lens system comprising a focusing lens and a correcting lens disposed on the image side and having on both sides aspherical surfaces, an inlet pupil of said correcting lens being located with said focusing lens, said system meeting the following conditions:

$-0.4 < d_0/f < -0.2$ where $d_0$ is the distance from a surface of the correcting lens on the object side to inlet pupil and f is the overall focal length.

16. An imaging lens system comprising a focusing lens and a correcting lens disposed on the object side, said correcting lens having aspherical surfaces on both sides.

* * * * *